(12) United States Patent
Mishima

(10) Patent No.: US 7,284,748 B2
(45) Date of Patent: Oct. 23, 2007

(54) VIBRATION DAMPING MOUNT AND METAL HEAT SHIELD

(75) Inventor: Kazuaki Mishima, Toyonaka (JP)

(73) Assignee: Sanwa Packing Industry Co., Ltd., Osaka (JP)

( * ) Notice: Subject to any disclaimer, the term of this patent is extended or adjusted under 35 U.S.C. 154(b) by 195 days.

(21) Appl. No.: 10/931,752

(22) Filed: Sep. 1, 2004

(65) Prior Publication Data

US 2005/0140075 A1 Jun. 30, 2005

(30) Foreign Application Priority Data

Dec. 25, 2003 (JP) ............... 2003-431359

(51) Int. Cl.
*F16F 15/00* (2006.01)
(52) U.S. Cl. ............. 267/140.11; 267/136; 267/161; 60/322
(58) Field of Classification Search ......... 267/136, 267/140.11, 140.3, 140.4, 141, 160, 161, 267/163, 257, 258; 248/610, 612, 634, 635, 248/629, 560, 580, 581, 592, 599, 602; 60/322
See application file for complete search history.

(56) References Cited

U.S. PATENT DOCUMENTS

| | | | |
|---|---|---|---|
| 3,467,350 A | 9/1969 | Tyler | |
| 3,770,231 A | 11/1973 | Kirchgessner et al. | |
| 4,199,128 A | 4/1980 | van den Boom et al. | |
| 4,957,279 A | 9/1990 | Thorn | |
| 5,110,097 A * | 5/1992 | Simon | 267/136 |
| 5,238,215 A | 8/1993 | Jeker et al. | |

FOREIGN PATENT DOCUMENTS

| | | |
|---|---|---|
| JP | 10-266850 | 10/1998 |
| JP | 2002-235800 | 8/2002 |

* cited by examiner

*Primary Examiner*—Thomas Williams
(74) *Attorney, Agent, or Firm*—Jordan and Hamburg LLP

(57) ABSTRACT

A vibration damping mount includes: a substantially annular damping member having an insertion hole, through which the bolt to be attached to an attachment boss is inserted, and externally surrounds the bolt; a grommet that includes a first retaining section for retaining a heat shield, a second retaining section for retaining the damping member, and a coupling section for coupling the first retaining section and the second retaining section, the second retaining section, the coupling section, and the first retaining section being provided in this order from the attachment boss side; and a collar member that includes a pair of flange sections, which nip the damping member from both sides in an axial direction with gaps formed on both the sides, and a coupling section, which couples the pair of flange sections each other and has a gap in a radial direction between the coupling section and the damping member.

3 Claims, 17 Drawing Sheets

24(23)

24(23)

26(25)

24(23)

VIBRATION DAMPING MOUNT AND METAL HEAT SHIELD

BACKGROUND OF THE INVENTION

The present invention relates to a vibration damping mount that is used for mounting, for example, a heat shield or a housing on a member generating a vibration or heat, and relates to a metal heat shield that can be attached to, for example, an exhaust manifold of an internal combustion engine using such a vibration damping mount.

A heat shield, which is an example of such a metal exhaust manifold heat shield or housing, is used in an automobile. Such a heat shield, for example, a part near an exhaust manifold mounted on an engine of an automobile so as to control heat and sound from the exhaust manifold not to propagate to the periphery of the engine. Such a heat shield is attached to the exhaust manifold by a screw member such as a bolt.

FIG. 2 is a front view of an engine 1 of a vehicle such as an automobile showing a basic structure of this conventional technique. FIG. 40 is a sectional view of the conventional technique. The conventional technique will be hereinafter explained with reference to both FIGS. 2 and 40. An exhaust manifold 2 is attached to a side of the engine 1 in order to discharge a combustion exhaust gas. A heat shield 3 is attached to the exhaust manifold 2 so as to cover this exhaust manifold 2.

The heat shield 3 is mounted in order to control heat and sound, which is generated from the exhaust manifold 2 as a pulsating combustion exhaust gas passes through the inside of the exhaust manifold 2, not to propagate to the periphery of the engine 1. Consequently, as shown in FIG. 40, the heat shield 3 has a structure in which a damping member 6 having heat insulating properties is nipped by an inner 4 and an outer 5 consisting of a metal plate, respectively. As this damping member 6, an inorganic fibrous material or an inorganic porous material is used.

A structure for attaching such a heat shield 3 to the exhaust manifold 2 will be explained as follows with reference to FIG. 40. In the heat shield 3, an insertion hole 8 for inserting a bolt 7 is formed, and a disk-like washer 9 is arranged. The bolt 7 is inserted through the washer 9 and the heat shield 3 and screwed to an attachment boss 10 of the exhaust manifold 2. Consequently, the heat shield 3 is attached to the exhaust manifold 2.

As an example of the heat shield 3 of the above-mentioned conventional technique, an heat shield disclosed in a published document JP-A-10-266850 is known. The heat shield of JP-A-10-266850 is constituted by placing two steel sheets one on top of the other.

The heat shield with such a structure is heavy, and a momentum of a vibration of the heat shield due to a vibration, which is transmitted from an exhaust manifold via a bolt or the like, increases. Consequently, a problem occurs in that a crack tends to be caused in a portion where the heat shield is attached to the bolt or the like, and durability is deteriorated.

In addition, in the case in which it is attempted to improve a sound insulation performance in such an heat shield, it is possible that a plate thickness is increased to control a degree of transmission of noise in the heat shield. However, in this case, a weight increases as described above. Therefore, there is a problem in that it is difficult to improve the sound insulation performance with such a conventional technique.

Further, the conventional technique has problems as described below. In the case in which the heat shield 3 is attached to the exhaust manifold 2 as shown in FIG. 40, concerning a vibration that is generated from the exhaust manifold 2 and transmitted through the bolt 7, it is difficult to absorb a vibration component in a direction crossing an axis of the bolt 7 indicated by arrow A3 in FIG. 40. Due to propagation of such a vibration component, the heat shield 3 produces resonance, or metal fatigue is caused around the portion where the bolt 7 of the heat shield 3 is attached. Consequently, problems such as an increase of noise and formation of a crack in the heat shield 3 occur, and a problem arises in a quality of the heat shield 3.

Moreover, concerning heat generated from the exhaust manifold 2, other than radiant heat from the exhaust manifold 2 to the heat shield 3, heat is transmitted to the heat shield 3 via the bolt 7.

In the heat shield 3 shown in FIG. 40, since the bolt 7 is in direct contact with the washer 9, and the washer 9 is in direct contact with the heat shield 3, the heat from the exhaust manifold 2 is easily transmitted to the heat shield 3. Consequently, temperature of the heat shield 3 rises, and the radiant heat increases to easily damage, for example, auxiliary devices, ducts, and harnesses around the engine 1 in a hood due to heat. Therefore, a problem arises in a quality as a heat shield.

As one of techniques for solving such problems, a technique shown in FIG. 41 is possible. FIG. 41 is a sectional view showing a vibration damping mount 11 that is used for attaching the heat shield 3 to the exhaust manifold or the like. A structure of the vibration damping mount 11 will be hereinafter explained.

A collar 12 is mounted in an insertion hole 8 of the heat shield 3. The collar 12 includes a cylindrical coupling section 13 and a pair of flange sections 14 and 15 that are formed integrally at both ends of the coupling section 13, respectively, and expand outwardly in a radial direction thereof. A distance between the flange sections 14 and 15 is formed larger than a thickness of the heat shield 3. Damping sheets 16 and 17, which are made of, for example, a felt-like body consisting of stainless steel fiber or an expand metal of stainless steel, are inserted between each of the flange sections 14 and 15 and the heat shield 3.

In other words, the flange sections 14 and 15 of the collar 12 nip and hold the pair of damping sheets 16 and 17 that nip the heat shield 3. The bolt 7 is inserted through the collar 12 and screwed into an attachment boss of exhaust manifold 2. Consequently, the heat shield 3 is attached to the exhaust manifold 2 via the vibration damping mount 11.

In this technique, a vibration, which has traveled from the bolt 7 to the collar 12, is transmitted to the damping sheets 16 and 17 and absorbed by compression and restoration actions in an axial direction of the bolt 7 of the damping sheets 16 and 17. Consequently, in this technique, a vibration to be transmitted from the bolt 7 to the heat shield 3 is controlled.

On the other hand, in such a technique shown in FIG. 41, the damping sheets 16 and 17 deteriorate due to secular changes and self weights thereof. Consequently, it is assumed that a problem may occur in that the compression and restoration characteristics of the damping sheets 16 and 17 are degraded and the action of controlling a vibration is degraded. In addition, since the damping sheets 16 and 17 are formed of the inorganic fiber, the expand metal, or the like, it is assumed that a problem may occur in that the fiber decomposes and flies as time elapses. In these regards, it is considered that the technique shown in FIG. 41 has a problem in that a quality with respect to a vibration damping action is low.

Moreover, as a yet another conventional technique for solving these problems, a vibration damping mount disclosed in, for example, a published document JP-A-2002-235800 is known. FIG. 42 is a sectional view of a vibration damping mount 11b that is disclosed JP-A-2002-235800. The vibration damping mount 11b of the conventional technique will be hereinafter explained with reference to FIG. 42. Components in FIG. 42 corresponding to the components, which have already been explained, will be denoted by the identical reference numerals and signs and will not be explained anew.

The vibration damping mount 11b includes: a substantially annular damping member 18 formed of stainless steel or the like that is provided externally surrounding the bolt 7; and a grommet 20 formed of aluminum alloy and having substantially an S shaped section that serves as a coupling component. The grommet 20 has an insertion hole 19 through which the bolt 7, which is screwed into the attachment boss 10 or the like of the exhaust manifold 2, is inserted.

The grommet 20 includes: a first retaining section 20a having a shape with an inner peripheral edge of a circular metal plate folded back to an outer peripheral portion in order to retain the heat shield 3; a second retaining section 20b having a shape with an outer peripheral edge of the circular metal plate folded back to an inner peripheral portion in order to retain the damping member 18; and a coupling section 20c that is formed bending over the first retaining section 20a and the second retaining section 20b and couples the heat shield 3 and the damping member 18 via the first retaining section 20a and the second retaining section 20b. In addition, the collar 12 formed of a galvanized steel plate is provided between an inner periphery of the damping member 18 and the bolt 7. Gaps are provided in an axial direction and a radial direction of the bolt 7 between the collar 12 and the damping member 18.

In the vibration damping mount 11b having such a structure, a vibration, which is generated from the exhaust manifold 2 and travels through the bolt 7, is transmitted to the heat shield 3 via the damping member 18 and the grommet 20. This vibration is attenuated by actions of the damping member 18 and the grommet 20.

However, such conventional techniques have problems to be explained below. It is known that the attachment boss 10, to which the bolt 7 is attached, is often formed in a size overlapping the grommet 20 as indicated by an alternate long and two short dash lines in FIG. 42. In such a case, since the grommet 20 and the attachment boss 10 are in contact with each other, noise due to this contact increases. In addition, it is assumed that contact portions of the grommet 20 and the attachment boss 10 wear with time due to this contact to result in breakage. Consequently, a problem arises in a quality of the vibration damping mount 11b.

In addition, on the basis of a difference of the materials of the collar 12, the damping member 18, and the grommet 20, a electrical current due to a difference of ionization tendencies of aluminum and stainless steel is generated between aluminum on a surface of the grommet 20 and stainless steel of the damping member 18, and electrolysis may occur in the grommet 20 and the damping member 18. Consequently, it is likely that the grommet 20 and the damping member 18 are broken. As a result, again, a problem arises in the quality of the vibration damping mount 11b.

BRIEF SUMMARY OF THE INVENTION

The present invention has been devised in order to solve the problems inherent in the heat shield and the vibration damping mount of the conventional techniques. It is an object of the present invention to provide a vibration damping mount with which the breakage due to wearing and the occurrence of electrolysis are prevented and the vibration damping action is improved remarkably and to provide a metal heat shield with which the sound insulation performance is improved remarkably.

A vibration damping mount according to an aspect of the present invention is a vibration damping mount that is arranged between plural object members, which are coupled each other using a screw member such as a bolt, and damps transmission of a vibration from one object member, which becomes a vibration source, to the other object member, characterized by including:

a substantially annular damping member that has an insertion hole, through which the screw member to be attached to the one object member is inserted, and is provided externally surrounding the screw member;

a coupling member that has an insertion hole through which the screw member to be attached to the one object member is inserted, and includes a first retaining section for retaining the other object member, a second retaining section for retaining the damping member, and a coupling section for coupling the first retaining section and the second retaining section, the second retaining section, the coupling section, and the first retaining section being provided in this order from the one object member side; and a collar member that is arranged between the screw member and the damping member and includes a pair of flange sections, which nip the damping member from both sides in an axial direction with gaps formed on both the sides, and a coupling section, which couples the pair of flange sections each other and has a gap in a radial direction between the coupling section and the damping member.

A vibration damping mount according to another aspect of the present invention is a vibration damping mount that is arranged between plural object members, which are coupled each other using a screw member such as a bolt, and damps transmission of a vibration from one object member, which becomes a vibration source, to the other object member, characterized by including:

a plural plate-like damping members stacked one on top of another and formed of an iron alloy that have an insertion hole, through which the screw member to be attached to the one object member is inserted, have films formed on surfaces thereof, the films containing at least a metal or a metal compound with an ionization tendency closer to that of aluminum than that of iron, and nip the other object member near an outer peripheral portion thereof so as to be displaceable in a radial direction; and a collar member that includes a pair of flange sections, which are arranged between the screw member and the damping members so as to be displaceable in a radial direction and an axial direction with respect to the damping members and nip the plural damping members from both sides in the axial direction with gaps formed on both the sides, and a coupling section for coupling the pair of flange sections.

A vibration damping mount according to yet another aspect of the present invention is a vibration damping mount that is arranged between plural object members, which are coupled each other using a screw member such as a bolt, and damps transmission of a vibration from one object member, which becomes a vibration source, to the other object member, characterized by including:

a plural plate-like damping members formed of an iron alloy and stacked one on top of another that have an insertion hole, through which the screw member to be attached to the one object member is inserted, have films formed on surfaces thereof, the films containing at least a metal or a metal compound with an ionization tendency closer to that of aluminum than that of iron, and nip the other object member near an outer peripheral portion thereof so as to be displaceable in a radial direction, the part near the outer peripheral portion being formed as a free end that vibrates freely; and a collar member that includes a pair of flange sections, which are arranged between the screw member and the damping members so as to be displaceable in a radial direction and an axial direction with respect to the damping members and nip the plural damping members from both sides in the axial direction, and a coupling section for coupling the pair of flange sections.

A vibration damping mount according to yet another aspect of the present invention is a vibration damping mount that is arranged between plural object members, which are coupled each other using a screw member such as a bolt, and damps transmission of a vibration from one object member, which becomes a vibration source, to the other object member, characterized by including:

a damping member formed of an iron alloy that has an insertion hole, through which the screw member to be attached to the one object member is inserted, has a film formed on a surface thereof, the film containing at least a metal or a metal compound with an ionization tendency closer to that of aluminum than that of iron, and includes a coupling section, which is coupled to the other object member, and a vibration section, which is an area separated from the other object member and the screw member and is allowed to be bent and displaced.

A vibration damping mount according to yet another aspect of the present invention is a vibration damping mount that is arranged between plural object members, which are coupled each other using a screw member such as a bolt, and damps transmission of a vibration from one object member, which becomes a vibration source, to the other object member, characterized by including:

a spacer that has a substantially cylindrical base section having an insertion hole, through which the screw member to be attached to the one object member is inserted, and a sliding section, which integrally continues outwardly in a radial direction of the base section and has a pair of sliding surfaces, a distance between which in an axial direction decreasing toward a outside in the radial direction;

a nip member that is arranged outwardly in a radial direction of the spacer and includes a pair of nip pieces, which are arranged increasingly spaced apart from each other in the axial direction from an outside in the radial direction toward an inside in the radial direction, the pair of nip pieces consisting of a material having a spring property, which elastically nips the sliding section of the spacer from sides opposed to each other on the inside in the radial direction, and being allowed to be displaced from each other at least in the radial direction with respect to the spacer; and a coupling member that includes a first retaining section for retaining a part near an end in the outside in the radial direction of the nip member, a second retaining section for retaining the other object member, and a coupling section for coupling the first retaining section and the second retaining section, the first retaining section, the coupling section, and the second retaining section being provided in this order from the one object member side.

A metal heat shield according to yet another aspect of the present invention is a metal heat shield that includes one or more aluminum alloy plates, on which corrugate shapes extending in directions crossing each other are formed, and forms a three-dimensional shape, characterized in that a flange section is provided at least in one part of an outer peripheral part of the three-dimensional shape, and the corrugate shapes in a crush object portion including the flange section are crushed to be formed in a substantially tabular shape, and one of the directions crossing each other is set in a direction crossing a main ridge equivalent portion constituting the three-dimensional shape.

According to an aspect of the present invention, a vibration from the one object member is transmitted through the screw member, the collar member, the damping member, and the coupling member. In addition, the second retaining section, the coupling section, and the first retaining section of the coupling member are provided in this order from the side of the one member that is a vibration source. In other words, the first retaining section is located on the opposite side of the one object member with respect to the damping member.

Therefore, even in the case in which an attachment portion of the one object member with respect to the screw material has a size in a radial direction overlapping the coupling member, a situation in which the attachment portion of the one object member comes into contact with the coupling member or the other object member retained by this coupling member is prevented. Consequently, an increase in noise due to the contact is controlled.

In addition, in the case in which contact of the attachment portion and the coupling member or the other object member is assumed, it is assumed that a contact portion of the coupling member with the attachment portion wears due to this contact to result in breakage. Occurrence of such breakage is prevented in this aspect of the present invention. Consequently, a quality of the vibration damping mount is improved remarkably.

According to another aspect of the present invention, the plate-like damping members have the films, which contain at least a metal or a metal compound having an ionization tendency closer to that of aluminum than that of iron, formed on the surfaces thereof. Therefore, even in the case in which the collar member or the like, with which the damping members are in contact, is constituted by iron or a metal having an ionization tendency close to that of iron, occurrence of electrolysis is prevented, and a quality of the vibration damping mount can be improved remarkably.

According to yet another aspect of the present invention, the films containing at least a metal or a metal compound having an ionization tendency closer to that of aluminum than that of iron are formed on the surfaces of the plate-like damping members formed of an iron alloy and stacked one on top of another that nip the other object member near an outer peripheral portion thereof so as to be displaceable in a radial direction, the part near the outer peripheral portion being formed as a free end that vibrates freely. Therefore, actions and effects same as those described above can be realized.

According to yet another aspect of the present invention, the film containing at least a metal or a metal compound having an ionization tendency closer to that of aluminum than that of iron is formed on the surface of the damping member formed of an iron alloy that includes the coupling section, which is coupled to the other object member, and the vibration section, which is an area separated from the other object member and the screw member and is allowed to be bent and displaced. Therefore, actions and effects same as those described above can be realized.

According to yet another aspect of the present invention, vibration, which occurs in the one object member, is transmitted to the other object member via the spacer, the nip member, and the coupling member. In this aspect of the present invention, the sliding section on the outside in the radial direction of the spacer is nipped by the pair of nip pieces of the nip member elastically. The spacer and the nip member are allowed to be displaced from each other in the radial direction. Therefore, when the spacer vibrates in the radial direction, the nip member and the spacer are displaced from each other in the radial direction while the pair of nip pieces move along the sliding section of the spacer. Consequently, the vibration in the radial direction of the spacer is absorbed by the mutual displacement in the radial direction of the spacer and the nip member.

In addition, the nip member has a spring property. Therefore, vibration in the axial direction of the spacer is absorbed by vibration in the axial direction of the nip member.

Consequently, the vibration of the spacer is absorbed by the spacer and the nip member, and a degree of transmission of vibration from the one object member to the other object member can be controlled remarkably.

According to yet another aspect of the present invention, the first direction of the plural corrugate shapes formed on the metal heat shield is set in the direction crossing the major ridge equivalent portion. Thus, the corrugate shapes realize a function of a rib with respect to a vibration around the ridge equivalent portion.

On the other hand, when the metal heat shield is mounted against a vibration source, the metal heat shield is also vibrated by transmission of a vibration from the vibration source. When the metal heat shield is vibrated by this vibration, it is known that portions of the metal heat shield on both sides of the major ridge equivalent portion tend to vibrate to flop around the portion.

In this aspect of the present invention, vibration of the metal heat shield can be controlled by the rib action. Therefore, occurrence of a crack in the metal heat shield can be prevented, and a quality of the metal heat shield can be improved remarkably.

In addition, in this aspect of the present invention, the flange section is formed at least in a part of the outer peripheral portion of the metal heat shield having a three-dimensional shape. Thus, this flange section realizes a function of a rib with respect to vibration at the time of vibration of the metal heat shield. Consequently, a vibration characteristic of the metal heat shield is also improved.

Further, in this aspect of the present invention, the corrugate shapes of the crush object portion including the flange section of the metal heat shield are crushed to be formed in a substantially tabular shape. Thus, in the case in which bending work, drilling work, or inscription work for the outer peripheral portion of the metal heat shield is performed, an object portion of the work can be treated in the same manner as a tabular metal plate. Therefore, workability in manufacturing the metal heat shield having such a structure is improved.

BRIEF DESCRIPTION OF THE DRAWINGS

In the accompanying drawings:

FIG. 37 is a plan view of the spacer 90a;

FIG. 39 is a plan view of the nip member 97a;

DETAILED DESCRIPTION OF THE INVENTION

Even in the case in which an attachment portion of one object member with respect to a screw material has a size in a radial direction overlapping a coupling member, a situation in which the attachment portion of the one object member comes into contact with the coupling member or the other object member retained by this coupling member is prevented. Consequently, an increase in noise due to the mutual contact is controlled.

In addition, a first direction, in which corrugate shape s formed on a metal heat shield extend, is set in a direction crossing a major ridge equivalent portion of the metal heat shield. Thus, the corrugate shapes realize a function of a rib with respect to a vibration around the ridge equivalent portion. According to this rib action, a vibration of the metal heat shield can be controlled, occurrence of a crack in the metal heat shield can be prevented, and a quality of the metal heat shield can be improved remarkably.

Embodiments of the present invention will be hereinafter explained.

FIRST EMBODIMENT

FIGS. 1 to 9 show a first embodiment of the present invention.

Figure 1:
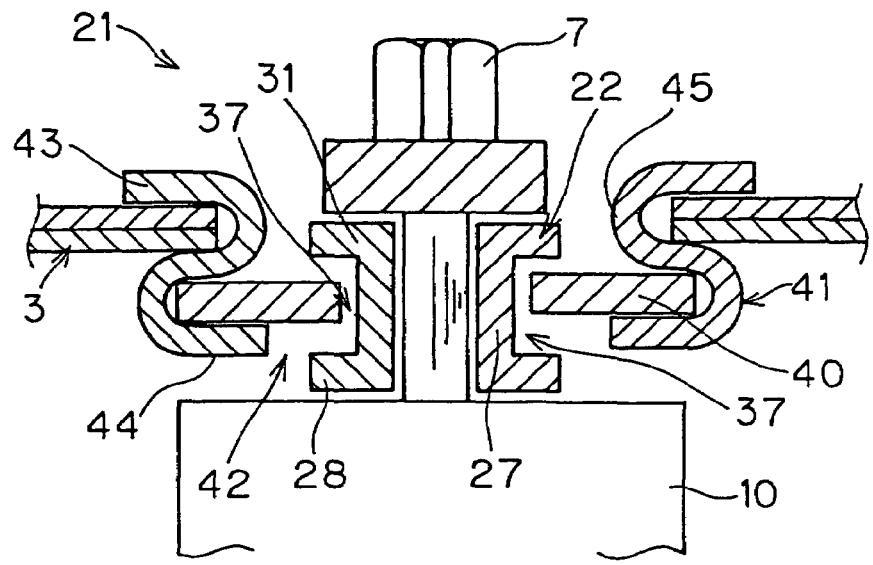
FIG. 1 is a sectional view of a vibration damping mount 21 according to a first embodiment of the present invention.
Figure 2:
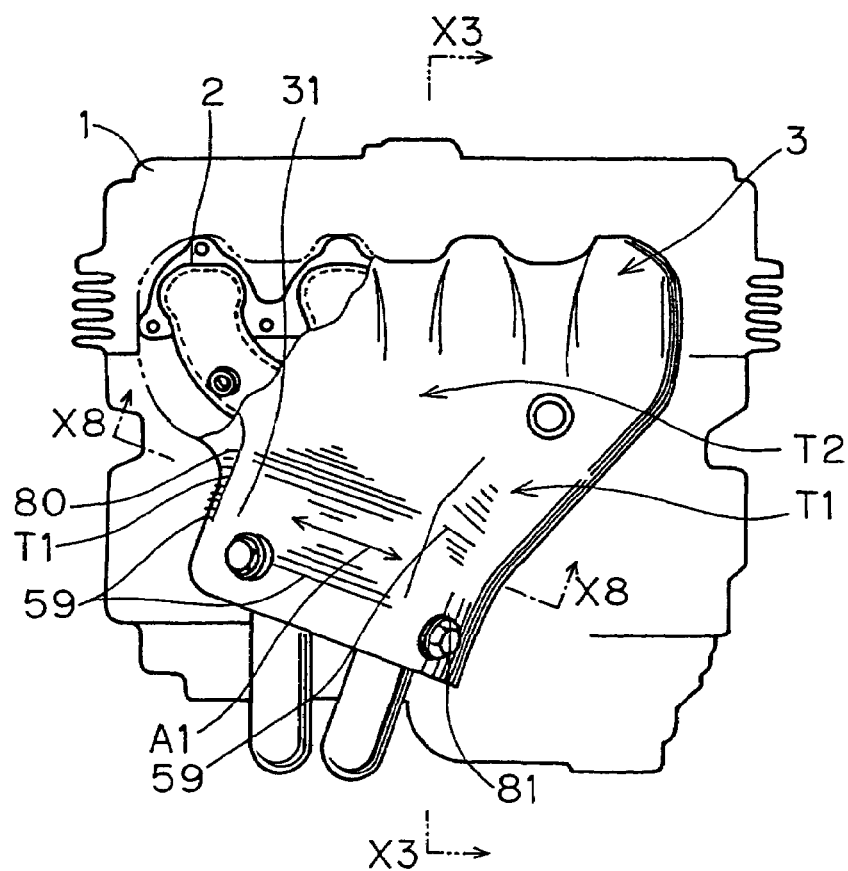
FIG. 2 is a front view of an engine 1 showing a structure forming a basis of the present invention.
Figure 3:
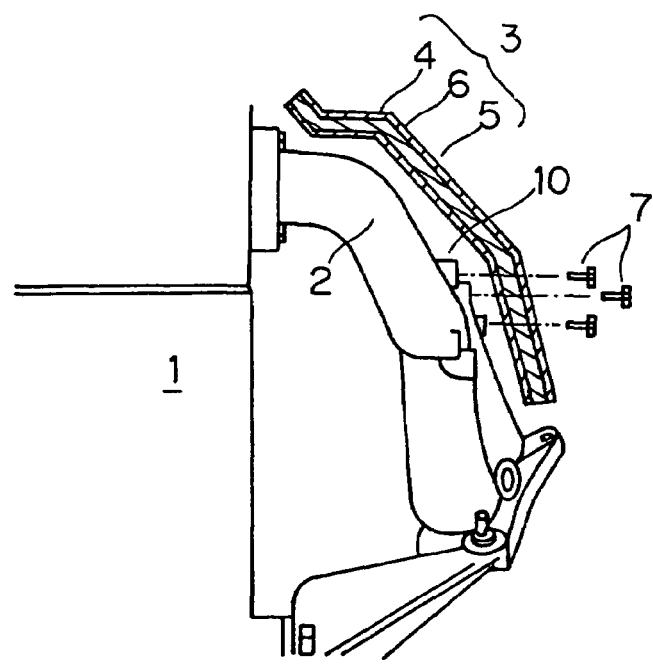
FIG. 3 is a sectional view of the engine 1 viewed from a section line X3-X3 in FIG. 2.
Figure 4:
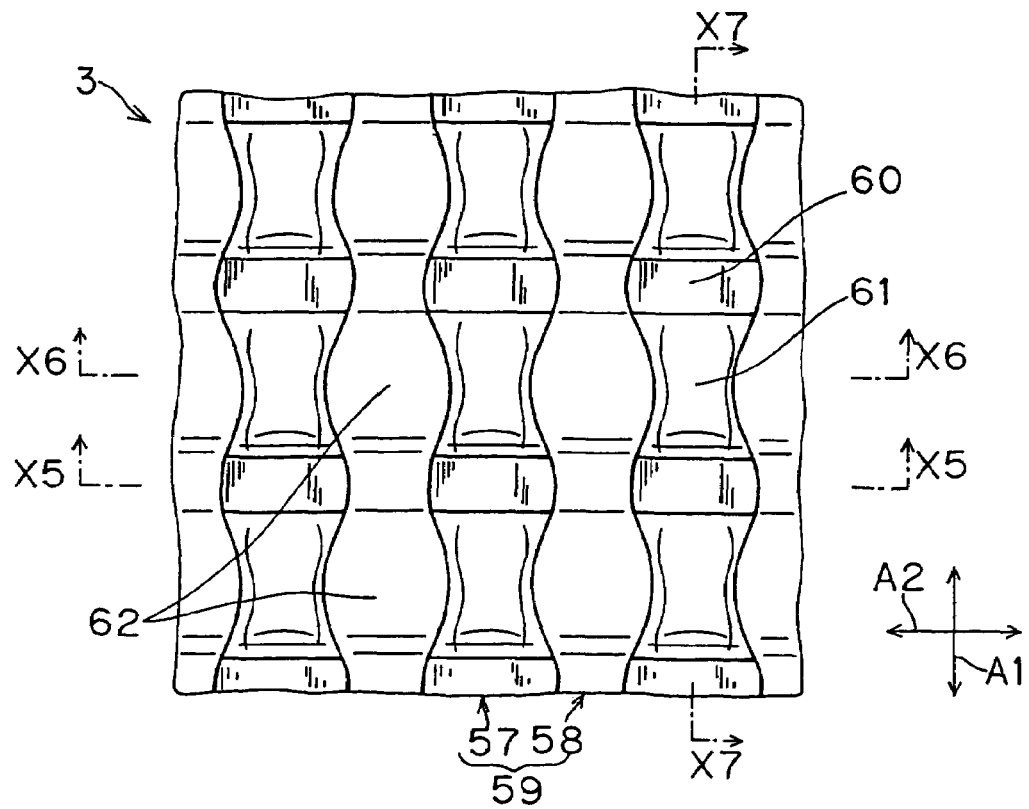
FIG. 4 is an enlarged front view of a heat shield 1.
Figure 5:
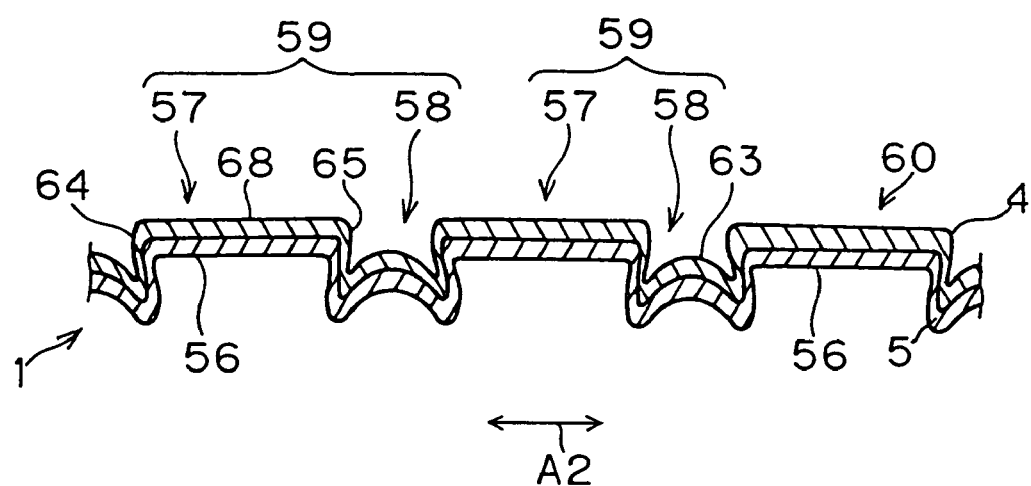
FIG. 5 is a sectional view of the heat shield 1 viewed from a section line X5-X5 in FIG. 4.
Figure 6:
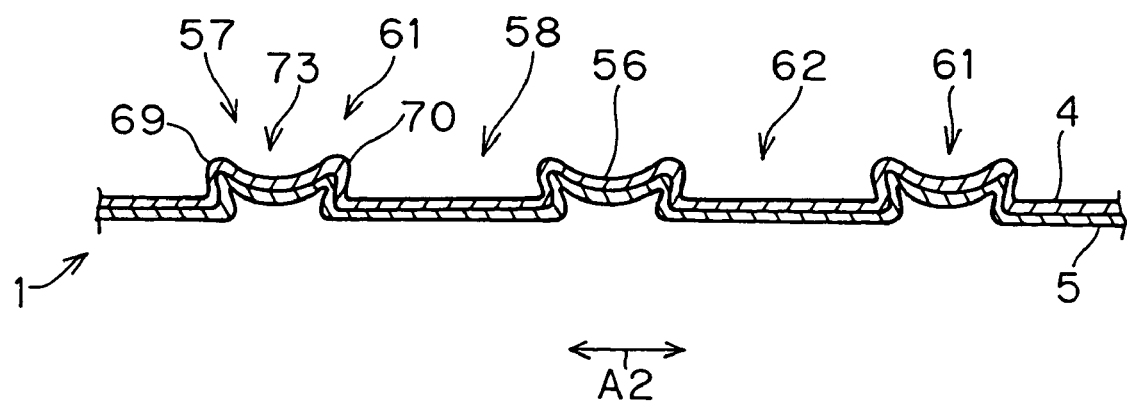
FIG. 6 is a sectional view of the heat shield 1 viewed from a section line X6-X6 in FIG. 4.
Figure 7:
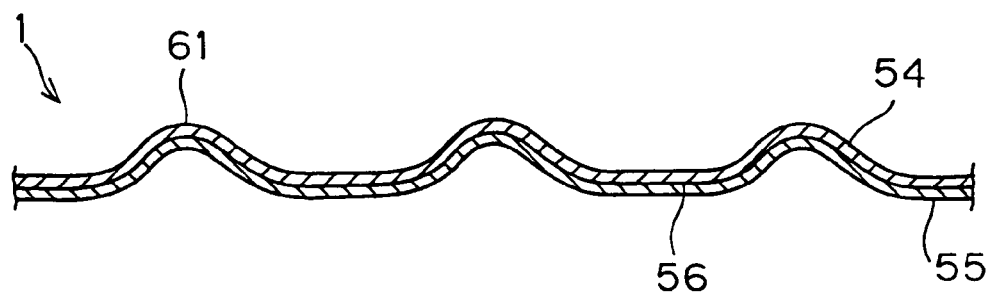
FIG. 7 is a sectional view of the heat shield 1 viewed from a section line X7-X7 in FIG. 4.
Figure 8:
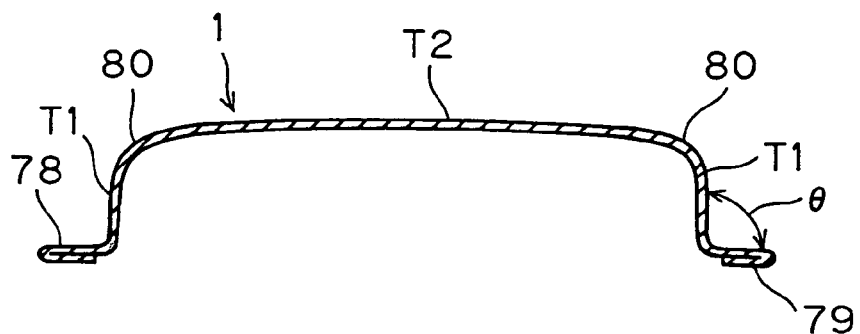
FIG. 8 is a simplified sectional view of the engine 1 viewed from a section line X8-X8 in FIG. 2.
Figure 9:
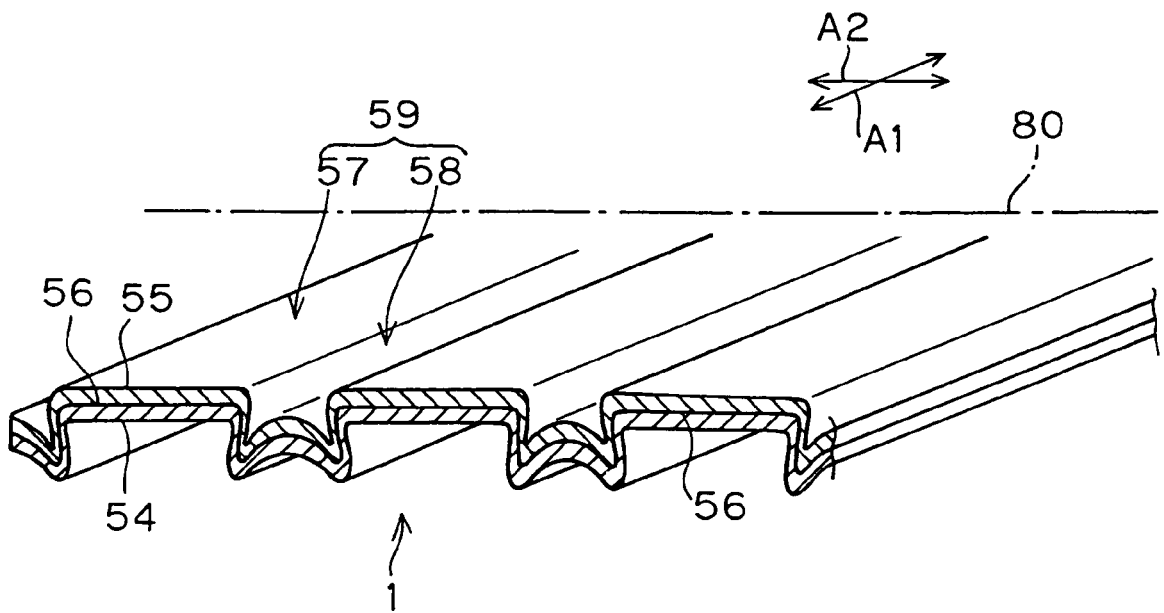
FIG. 9 is a view illustrating characteristics of this embodiment.

FIG. 1 is a sectional view schematically showing a state in which a vibration damping mount 21 of this embodiment is used. FIG. 2 is a front view of an engine 1 showing a structure forming a basis of the present invention. FIG. 3 is a sectional view of the engine 1 viewed from a section line X3-X3 in FIG. 2. FIG. 4 is an enlarged front view of a metal exhaust manifold heat shield (hereinafter referred to as heat shield) 1 of an embodiment of the present invention. FIG. 5 is a sectional view of the heat shield viewed from a section line X5-X5 in FIG. 4. FIG. 6 is a sectional view of the heat shield viewed from a section line X6-X6 in FIG. 4. FIG. 7 is a sectional view of the heat shield viewed from a section line X7-X7 in FIG. 4. FIG. 8 is a simplified sectional view of the engine 1 viewed from a section line X8-X8 in FIG. 2. FIG. 9 is a view illustrating characteristics of this embodiment.

This embodiment will be hereinafter explained with reference to FIGS. 1 to 9. Note that, since FIG. 2 has been referred to and explained in the section of the conventional technique, a repeated explanation will be omitted. When FIG. 2 is referred to, the above-described reference numerals and signs will be applied. In addition, in FIG. 2, a heat shield 3, which is an embodiment of the metal exhaust manifold heat shield of the present invention, is attached to an exhaust manifold 2 mounted on the engine 1.

In this case, plural object members include the engine 1, the exhaust manifold 2, and the heat shield 3. In the case of this embodiment, the exhaust manifold 2 constitutes one object member, the heat shield 3 constitutes the other object member, and the bolt 7 constitutes a screw member. In this embodiment, as shown in FIG. 3, the heat shield 3 has a structure in which a damping member 6 having heat insulating properties is nipped between an inner 4 and an outer 5 consisting of a metal plate, respectively.

The heat shield 3 in this embodiment will be hereinafter explained. As shown in FIG. 3, the heat shield 3 of this embodiment is constituted by stacking a pair of metal plates (e.g., NIMBUS manufactured by T&N) 4 and 5 consisting of an aluminum alloy having a specific gravity of about 2.7 and a heat resistant vibration damping member (hereinafter referred to as damping member) 6, which is nipped by the metal plates 4 and 5, consisting of inorganic fiber or the like, and is formed in a three-dimensional shape along an external shape of the exhaust manifold 2. As shown in FIG. 8, the heat shield 3 includes a sidewall T1 and a top T2 that couples an entire periphery of an end of this sidewall T1. The sidewall T1 and the top T2 continue at an obtuse angle θ. In this embodiment, the metal plates 4 and 5 are explained as including an aluminum foil or an aluminum alloy foil or a thin plate consisting of aluminum or an alloy of aluminum.

As shown in FIGS. 4 to 7, the metal plates 4 and 5 used in the heat shield 3 of this embodiment have a shape in which corrugate shapes 59 having alternately repeated elevated portions 57 and valley portions 58 extend in a first direction A1, and other corrugated shapes continue in a second direction A2 that is a direction crossing the first direction A1, preferably a direction perpendicular to the first direction A1. As shown in FIGS. 4 to 7, in the elevated portions 57, first rising portions 60 and second rising portions 61 rise from the valley portions 58 and are arranged alternately in a longitudinal direction thereof. In addition, as shown in FIGS. 4 to 6, in the valley portions 58, flat portions 62 and recessed portions 63 are arranged alternately.

As shown in FIG. 5, the first rising portions 60 include a pair of sidewalls 64 and 65, which rise in a substantially trapezoid shape from the valley portions 58, and relatively flat tops 68, which are formed by coupling tips of the sidewalls 64 and 65 each other. The first rising portions 60 are bent inward such that tips of the first rising portions 60 are wider than base ends thereof.

On the other hand, as shown in FIG. 6, the second rising portions 61 are formed by crushing the first rising portions 60 in substantially a width direction by a predetermined degree. The second rising portions 61 includes a pair of sidewalls 69 and 70, which rise from the flat portions 62, and recessed portions 73, which couple tips of the sidewalls 69 and 70 each other and are recessed to a lower side in FIG. 6. Such second rising portions 61 and recessed portions 63 are formed so as to continue in a disconnected manner, respectively, in the second direction A2 that is a direction substantially perpendicular to the first direction A1 in which the plural corrugate shapes 59 extend.

Therefore, as shown in FIGS. 5 and 6, projected portions of the elevated portions 57 of the metal plate 5 are fit into inwardly bent inner peripheral portions of the elevated portions 57 of the metal plate 4. In addition, in the second rising portions 61, the sidewalls 69 and 70 are also wider in tips than in the base ends thereof and formed in an inwardly bent shape. In such second rising portions 61, projected portions of the second rising portions 61 of the metal plate 5 are fit into inwardly bent inner peripheral portions of the second rising portions 61 of the metal plate 4. Consequently, the metal plates 4 and 5 can be fixed to each other firmly without using any specific hold-down or fastener. The metal plates 4 and 5 are fixed each other in the same manner even in the case in which the damping member 6 consisting of inorganic fiber or the like is interposed between them. This is because the mutual coupling of the metal plates 4 and 5 depends upon a mechanical engagement relation thereof.

The heat shield 3 is formed by stamping the metal plates 4 and 5, which have such a shape and nip the damping member 6, in a three-dimensional shape along an external shape of the exhaust manifold 2.

A flange 78 with the corrugate shapes crushed by stamping is formed in an outer peripheral portion of the sidewall T1 of the heat shield 3 formed in the three dimensional shape. As shown in FIG. 8, this flange 78 is folded back to an inside of the heat shield 3, whereby a folded-back portion 79 is formed.

In the case in which this folded-back portion 79 is not formed, the outer peripheral portion of the heat shield 3 is in a state in which sharp cut ends of the blanked metal plates 4 and 5 are directly exposed to the outside. Therefore, this folded-back portion 79 prevents an assembly worker, who works holding the heat shield 3, or a worker or a general user, who is likely to hold the heat shield 3 in the case of maintenance of a vehicle after manufacturing, from hurting fingers in a process of mounting the heat shield 3 on the exhaust manifold 2 of the vehicle engine 2 in a manufacturing process of the vehicle.

In addition, in this embodiment, crush object portions, for which folding-down, drilling, or inscription is required to be preformed in the metal plates 4 and 5 having corrugate shapes, such as the flange 78, portions to be drilled, and portions to be inscribed of the heat shield 3 are formed in a substantially tabular shape with the corrugate shapes in the crush object portions crushed by stamping.

Therefore, since the corrugate shapes of the crush object portions including the flange 78 is formed in a substantially tabular shape, in the case in which bending, drilling, inscription, or the like of the outer peripheral portion of the heat shield 3 is performed, the object portions of such working can be treated in the same manner as the tabular metal plate.

In other words, when the working is performed, assuming a state in which the corrugate shapes remain, for example, in the case in which the folding-back work is performed by stamping, a situation in which the corrugate shapes under the folding-back work are crushed by the stamping is naturally anticipated. Thus, it is required to design a stamping die on the assumption that the corrugate shapes are crushed, and a large amount of labor and man-hours are required in the folding-back work.

On the other hand, in this embodiment, since the crush object portions can be treated in the same manner as the tabular metal plate, workability in manufacturing the heat shield 3 is improved remarkably.

Other characteristics of the heat shield 3 of this embodiment will be hereinafter explained with reference to FIGS. 2 and 8. As described above, the heat shield 3 of this embodiment is formed in a three-dimensional shape along a three-dimensional external shape of the exhaust manifold 2. Thus, as shown in FIGS. 2 and 8, one or more ridge equivalent portions 80, which are bent portions of the metal plates 4 and 5, are formed in the heat shield 3. In this embodiment, stamping to a three-dimensional shape is applied to the metal plates 4 and 5 such that the first direction A1, which is the longitudinal direction of the corrugate shapes 59, is a direction crossing the major ridge equivalent portion 80 of these plural ridge equivalent portions 80.

Here, the major ridge equivalent portion 80 is a portion where bent portions having a relatively large curvature, which characterizes an overall shape of the heat shield 3, continue. In other words, the major ridge equivalent portion 80 indicates a bent portion extending over a relatively long dimension, which substantially determines an external shape of the heat shield 3, of bent portions of various sizes formed on the heat shield 3.

When the heat shield 3 is mounted on the exhaust manifold 2, the heat shield 3 is also vibrated by transmission of a vibration from the exhaust manifold 2. When the heat shield 3 is vibrated by this vibration, it is assumed that portions of the heat shield 3 on both sides of the major ridge equivalent portion 80 are vibrated largely like wings of a butterfly around the major ridge equivalent portion 80. When such a vibration occurs, metal fatigue is caused in portions near the ridge equivalent portions 80 of the heat shield 3 due to repeated bending, and a crack easily occurs in the portions.

On the other hand, in this embodiment, the first direction A1 of the plural corrugate shapes 59 formed on the heat shield 3 is set in a direction crossing the major ridge equivalent portion 80, preferably a direction perpendicular to the major ridge equivalent portion 80. Thus, the corrugate shape 59 realizes a function of a rib with respect to a vibration around the ridge equivalent portion 80. Consequently, a vibration of the heat shield 3 can be controlled, occurrence of a crack in the heat shield 3 can be prevented, and a quality of the heat shield 3 can be improved remarkably.

In addition, with respect to a vibration that occurs in a direction in which the ridge equivalent portions 80 extend, the second rising portions 61 shown in FIGS. 4 to 6, which extend in a disconnected manner in the second direction A2 and continue in the first direction A1, also realize a function of a rib and control the vibration.

The vibration damping mount 21, which is used in this embodiment, will be hereinafter explained with reference to FIG. 1. The vibration damping mount 21 of this embodiment includes: a substantially annular damping member 40, which is provided externally surrounding the bolt 7, constituted by a tabular material such as an expand metal of stainless steel, and has a zinc film formed on a surface thereof by, for example, Dacrotized (trademark) treatment; and a grommet 41 that is a coupling member formed of an aluminum alloy and has substantially an S shaped section. The grommet 41 has an insertion hole 42 through which the bolt 7, which is screwed into the boss for bolt 10 of the exhaust manifold 2, is inserted.

In addition, the grommet 41 includes: a first retaining section 43 having a shape with an inner peripheral edge of a circular metal plate folded back to an outer peripheral portion in order to retain the heat shield 3; a second retaining section 44 having a shape with an outer peripheral edge of the circular metal plate folded back to an inner peripheral portion in order to retain the damping member 40; and a coupling section 45 that is formed bending over the first retaining section 43 and the second retaining section 44 and elastically couples the heat shield 3 and the damping member 40 via the first retaining section 43 and the second retaining section 44 so as to be displaced freely in an axial direction and a radial direction of the bolt 7.

In this embodiment, the coupling section 45 is a portion extending from a bent portion of the first retaining section 43 to a bent portion of the second retaining section 44. The second retaining section 44, the coupling section 45, and the first retaining section 43 are provided in this order from the exhaust manifold 2 side.

In addition, a collar member 22 formed of a galvanized steel plate is provided between an inner periphery of the damping member 40 and the bolt 7. The collar member 22 includes a cylinder section 27 and flange sections 28 and 31 that are formed integrally at both ends in an axial direction of the cylinder section 27, respectively. The collar member 22 and the damping member 40 are formed and arranged such that gaps 37 in an axial direction and a radial direction of the bolt 7 are formed between the collar member 22 and the damping member 40.

Actions and effects of the vibration damping mount 21 will be hereinafter explained. In the vibration damping mount 21, a vibration, which is generated from the exhaust manifold 2 and travels through the bolt 7, is transmitted to the heat shield 3 via the collar member 22, the damping member 40, and the grommet 41. In this case, the gaps 37 in the axial direction and the radial direction of the bolt 7 are formed between the collar member 22 and the damping member 40.

Therefore, the vibration transmitted from the bolt 7 to the collar member 22 is significantly controlled by the gaps 37 in a degree of transmission to the collar member 22. Consequently, a buffer action of the vibration damping mount 21 with respect to a vibration is improved remarkably, and a vibration control function of the heat shield 3 can be improved remarkably.

In addition, the damping member 40 can perform a bending motion in the axial direction of the bolt 7 easily because it is constituted by a tabular material such as an expand metal. Therefore, the vibration transmitted to the damping member 40 from the collar member 22 is converted into the bending motion of the damping member 40 and absorbed. In this regard, the buffer action of the vibration damping mount 21 is also improved, and the damping function of the heat shield 3 is also improved.

Further, in this embodiment, the second retaining section 43, the coupling section 45, and the first retaining section 44 of the grommet 41 are provided in this order from the exhaust manifold 2 side. In other words, the first retaining section 44 is located on the opposite side of the exhaust manifold 2 with respect to the damping member 40.

Therefore, even in the case in which the attachment boss 10 of the exhaust manifold 2 has a size in a radial direction overlapping the collar member 22, a situation in which the attachment boss 10 comes into contact with the grommet 41 or the heat shield 3 retained by the grommet 41 is prevented. Consequently, an increase in noise due to the contact is controlled.

In addition, in the case in which contact of the attachment boss 10 and the grommet 41 or the heat shield 3 is assumed, it is assumed that a contact portion of the grommet 41 with the attachment boss 10 wears due to this contact to result in breakage. In this embodiment, occurrence of such breakage is prevented. Consequently, a quality of the vibration damping mount 21 is improved remarkably.

Further, according to this embodiment, a zinc film having an ionization tendency closer to that of aluminum than that of iron is formed on the surface of the damping member 40. The collar member 22 is formed of a galvanized steel plate, and the grommet 41 is formed of an aluminum alloy. Therefore, in this embodiment, an action of reducing a difference of the ionization tendency between the damping member 40 and the grommet 41 is realized. Consequently, occurrence of electrolysis in the grommet 41 and the damping member 40 is controlled. In this regard, a quality of the vibration damping mount 21 is also improved remarkably.

MODIFICATION OF THE FIRST EMBODIMENT

Figure 25:
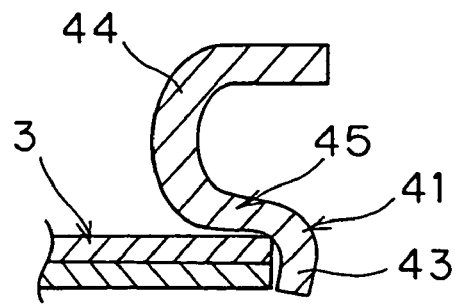
FIG. 25 is a sectional view showing a modification of the first embodiment.

As a modification of this embodiment, as shown in FIG. 25, the first retaining section 43 of the grommet 41 may be fixed in abutment with the inner peripheral end of the heat shield 3 rather than being folded back as described above. In such a modification, it is evident that actions and effects same as those in the above-mentioned embodiment are realized. Therefore, this embodiment can realize actions and effects same as those in the above-mentioned embodiment.

SECOND EMBODIMENT

Figure 10:
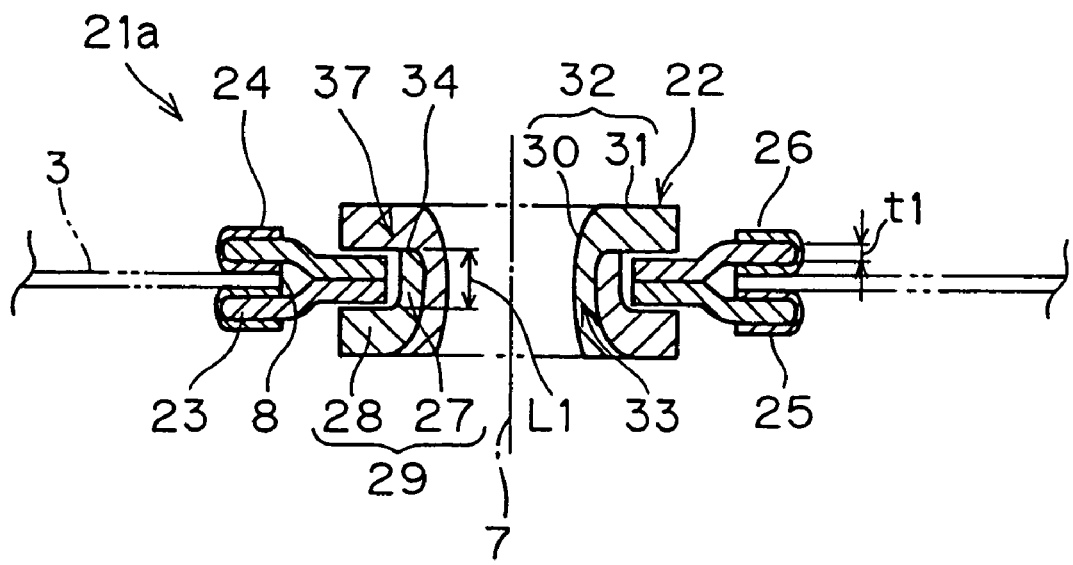
FIG. 10 is a sectional view schematically showing a vibration damping mount 21a according to a second embodiment of the present invention.
Figure 11:
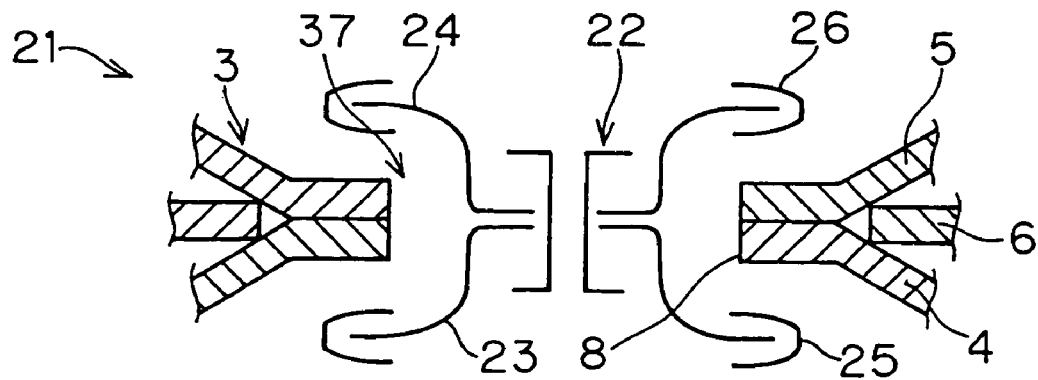
FIG. 11 is a sectional view showing a principle of this embodiment.
Figure 12:
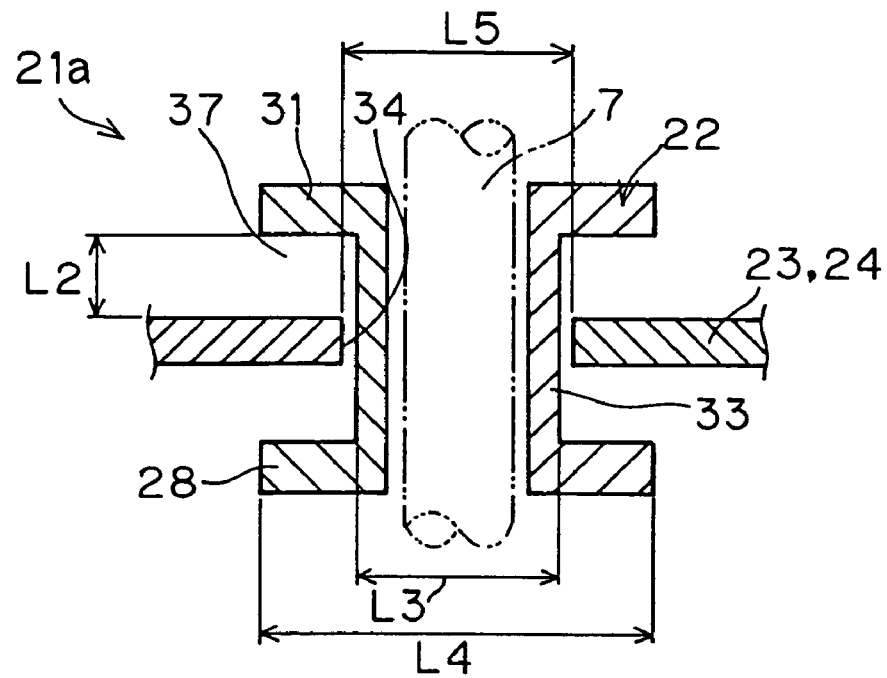
FIG. 12 is an enlarged sectional view showing the principle of this embodiment.
Figure 13:
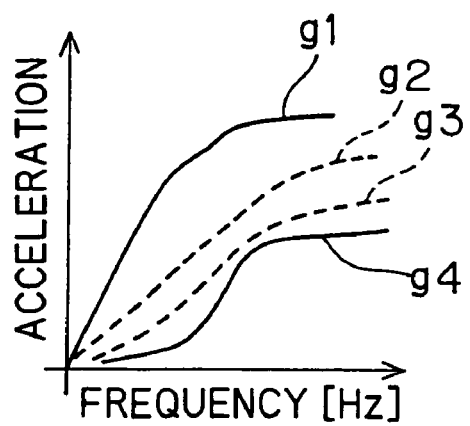
FIG. 13 is a graph showing an effect of this embodiment.

FIG. 10 is a sectional view schematically showing a vibration damping mount 21a according to a second embodiment of the present invention. FIG. 11 is a sectional view showing a principle of this embodiment. FIG. 12 is an enlarged sectional view showing the principle of this embodiment. FIG. 13 is a graph showing an effect of this embodiment.

The vibration damping mount 21a according to the second embodiment of the present invention will be explained with reference to FIGS. 10 to 13.

This embodiment is similar to the above-mentioned embodiment. Components corresponding to those in the above-mentioned embodiment are denoted by the identical reference numerals and signs. In this embodiment, when the heat shield 3 is attached to the exhaust manifold 2, the vibration damping mount 21a shown in FIG. 10 is used. The vibration damping mount 21a includes: a collar member 22; spring washers 23 and 24, which are damping members with thickness t1, mounted on the collar member 22; and circular grommets 25 and 26 mounted on outer peripheral edges of the spring washers 23 and 24, respectively.

The collar member 22 includes: a collar piece 29 that includes a cylinder section 27 and a flange section 28 integrally formed at one end in an axial direction of the cylinder section 27; and a collar piece 32 that includes a cylinder section 30 having a diameter larger than the cylinder section 27 and a flange section 31 integrally formed at one end in an axial direction of the cylinder section 30. The flanges 28 and 31 are constituted to be apart from each other by a distance L1 shown in FIG. 10 in a state in which the cylinder section 27 is pressed and fixed in the cylinder section 30. Plate thicknesses of collar pieces 29 and 32, and the like are selected such that the distance L1 satisfies the following condition.

$$L1 > 2 \times t1 \tag{1}$$

Therefore, when the spring washers 23 and 24 are mounted on the collar member 22, as shown in FIG. 12, a gap 37 is formed between the flange sections 28 and 31 and the spring washers 23 and 24. The gap 37 has a length L2, which is calculated as follows, in the axial direction of the bolt 7.

$$L2 = L1 - 2 \times t1 \tag{2}$$

In addition, the collar member 22 having the flange sections 28 and 31 and the cylinder section 33 is constituted by combining the collar pieces 29 and 32 as described above.

The spring washers 23 and 24 are formed of any one of plate-like materials such as a metal plate, a punching metal, an expand metal, and a wire gauze. As an example, this embodiment will be explained assuming that the spring washers 23 and 24 are formed of an expand metal. The spring washers 23 and 24 are formed in substantially a circular shape. As shown in FIG. 12, an insertion hole 34 having an inner diameter L5, which is larger than an outer diameter L3 of the cylinder section 33 of the collar member 22 and smaller than an outer diameter L4 of the flange sections 28 and 31, is formed in the spring washers 23 and 24.

$$L3 < L5 < L4 \tag{3}$$

Therefore, in order to mount such spring washers 23 and 24 on the collar member 22, the collar member 22 is divided into two as shown in FIG. 10, and after mounting the spring washers 23 and 24 on, for example, the collar piece 29, the collar piece 32 is pressed into the collar piece 29. In this way, the spring washers 23 and 24 are mounted on the collar member 22. Consequently, the gap 37 has a length (L5-L4) in the radial direction of the bolt 7.

As shown in FIG. 10, grommets 25 and 26 are mounted on outer peripheries of the spring washers 23 and 24. The grommets 25 and 26 are formed by folding back an outer periphery of a circular metal plate consisting of, for example, a stainless steel plate or an aluminum alloy to the inside. Therefore, the grommets 25 and 26 are formed so as to wrap the outer peripheries of the spring washers 23 and 24.

In the case of this embodiment, the spring washers 23 and 24 are formed of an expand metal, and sharp cut ends project on the outer periphery in a state in which the spring washers 23 and 24 remain cut. By wrapping parts near the cut ends with the grommets 25 and 26, effects of improving the appearance of the spring washers 23 and 24 and retaining the washers 23 and 24 to prevent a worker who works holding the spring washers 23 and 24 from hurting fingers are realized.

As shown in FIG. 10, the heat shield 3 is nipped and retained between the spring washers 23 and 24 mounted with such grommets 25 and 26. In order to attach such a heat shield 3, which is mounted with the vibration damping mount 21a, to the exhaust manifold 2, the bolt 7 is inserted through the inside of the cylinder section 33 of the collar member 22 to be screwed into the attachment boss 10 or the like of the exhaust manifold 2. In this way, the heat shield 3 is attached to the exhaust manifold 2.

Actions of the vibration damping mount 21a of this embodiment will be hereinafter explained. According to the vibration damping mount 21a of this embodiment, a vibration, which is generated from the exhaust manifold 2 and travels through the bolt 7, is transmitted to the spring washers 23 and 24 via the collar member 22. In this case, the gap 37 is provided between the pair of flange sections 28 and 31 of the collar member 22 and the spring washers 23 and 24. Consequently, the collar member 22 and the spring washers 23 and 24 are allowed to be relatively displaced in a direction parallel to and a direction crossing the axial direction of the bolt 7. Therefore, the vibration from the bolt 7 is absorbed by the relative displacement of the collar member 22 and the spring washers 23 and 24, whereby the transmission of the vibration to the spring washers 23 and 24 can be controlled.

In addition, the vibration from the spring washers 23 and 24 is transmitted to the heat shield 3. In this case, since the spring washers 23 and 24 are formed in a plate shape, the spring washers 23 and 24 bend in the axial direction of the bolt 7. Consequently, the transmission of the vibration from the spring washers 23 and 24 to the heat shield 3 is controlled.

The inventor performed an experiment concerning such an action and obtained measurement results shown in a graph in FIG. 13. In FIG. 13, a horizontal axis shows a frequency, and a vertical axis shows an acceleration of a vibration. A curve g1 indicates a result of measuring a vibration of only the collar member 22, a curve g2 indicates a result of measuring a vibration transmitted to the heat shield 3 of the vibration damping mount 11 having the structure shown in FIG. 29, a curve g3 indicates a result of measuring a vibration of a trial product without the gap 37 between the collar member 22 and the spring washers 23 and 24, and a curve g4 indicates a result of measuring a vibration in this embodiment.

Figure 29:
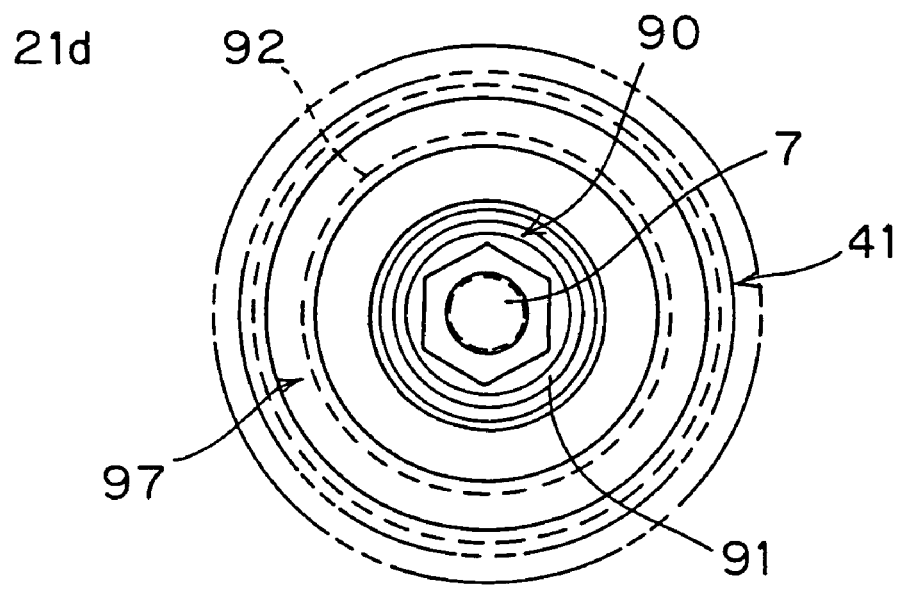
FIG. 29 is a plan view of the vibration damping mount 21d.

As it is seen from these measurement results, a damping characteristic in all frequency bands of vibrations generated from the engine 1 and the exhaust manifold 2 is improved in the case in which the spring washers 23 and 24 constituted by, for example, an expand metal of this embodiment are used compared the case in which the felt-like damping sheet shown in FIG. 29 is used. In particular, as in this embodiment, the damping characteristic is improved in the example of the structure provided with the gap 37. Above all, the damping characteristic in a relatively low frequency band is improved.

In addition, the exhaust manifold 2 also serves as a heat source for causing a combustion exhaust gas from the engine 1 to flow. In such a case, when heat from the exhaust manifold 2, which is transmitted through the bolt 7, is transmitted to the spring washers 23 and 24 via the collar member 22, thermal conduction is blocked efficiently by the gap 37 between the pair of flange sections 28 and 31 of the collar member 22 and the spring washers 23 and 24. Consequently, transmission of the heat from the exhaust manifold 2 to the heat shield 3 is also controlled efficiently.

As a result, in this embodiment, transmission of a vibration from the exhaust manifold 2, which is a vibration source, to the heat shield 3 is controlled efficiently. Thus, a situation in which the heat shield 3 is resonated by the transmitted vibration or metal fatigue occurs near the attachment portion of the heat shield 3 to the bolt 7 can be prevented, a situation of an increase in noise, occurrence of a crack in the heat shield 3, and the like can be eliminated, and a quality of the heat shield 3 can be improved remarkably. In addition, since the transmission of heat from the exhaust manifold 2 can be controlled efficiently, the quality can also be improved in this regard.

THIRD EMBODIMENT

Figure 14:
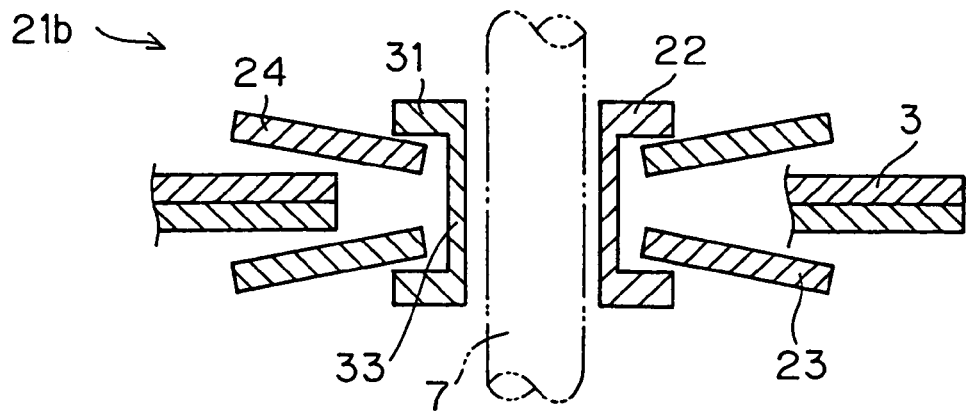
FIG. 14 is a sectional view of a vibration damping mount 21b according to a third embodiment of the present invention.
Figure 15:
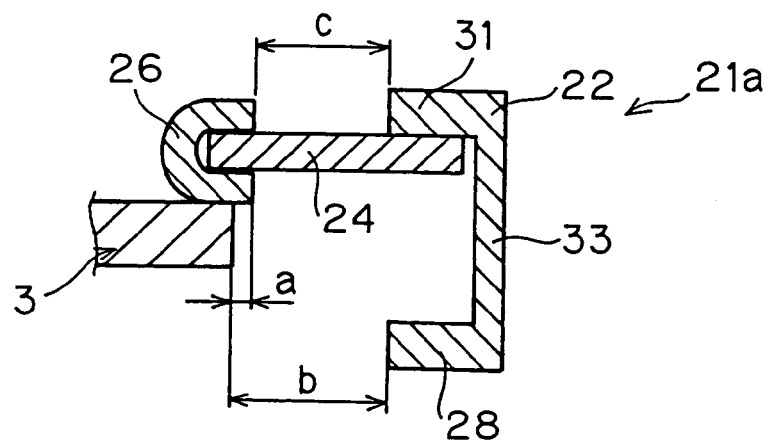
FIG. 15 is a sectional view of a comparative example of this embodiment.
Figure 16:
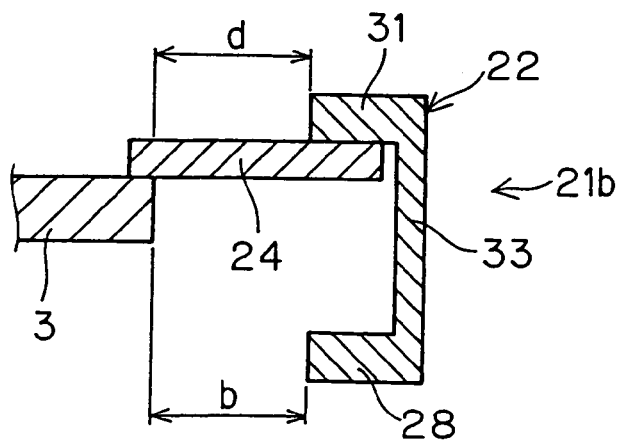
FIG. 16 is a sectional view showing characteristics of the vibration damping mount 21b.
Figure 17:
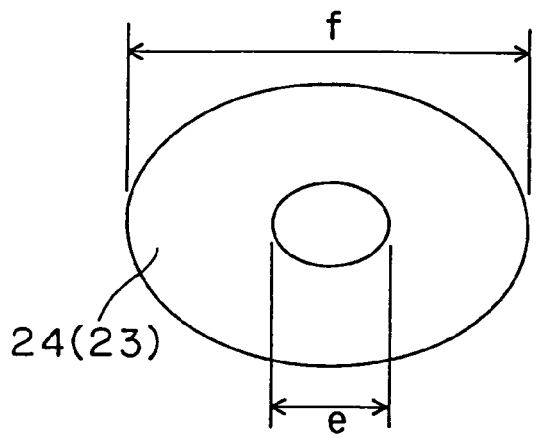
FIG. 17 is a plan view of spring washers 23 and 24 of the vibration damping mount 21b.
Figure 18:
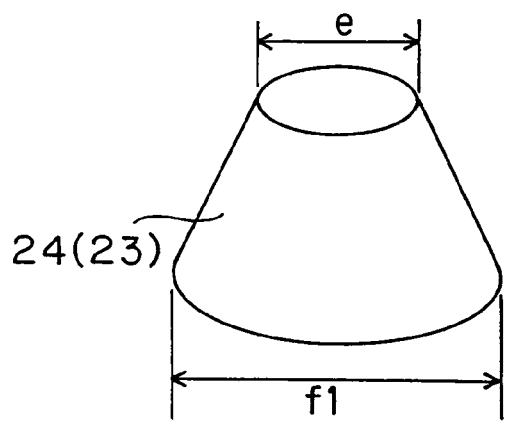
FIG. 18 is a perspective view of the spring washers 23 and 24.
Figure 19:
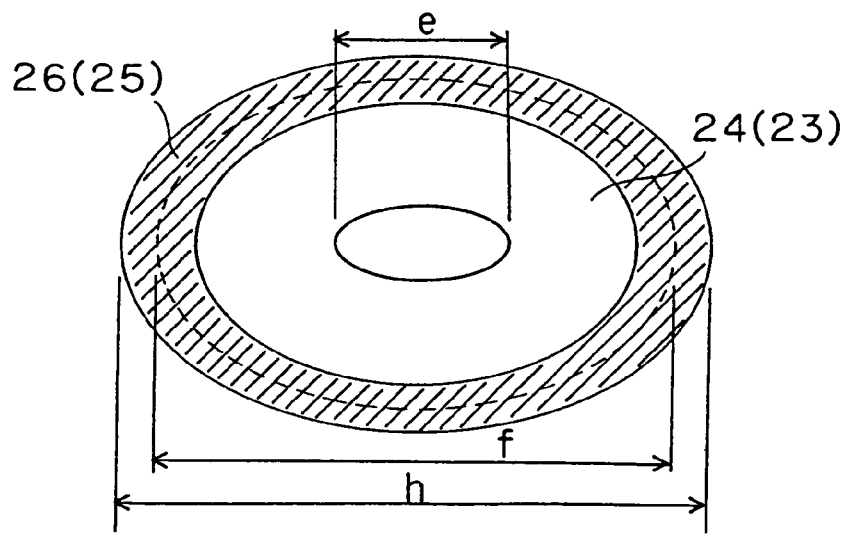
FIG. 19 is a perspective view of a comparative example with respect to the vibration damping mount 21b.
Figure 20:
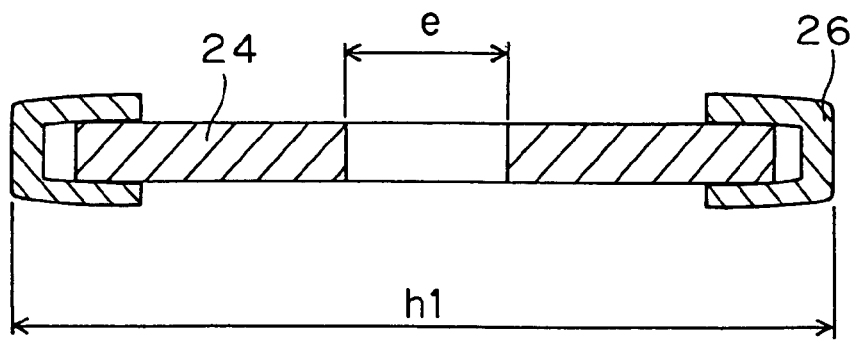
FIG. 20 is a sectional view of the comparative example.
Figure 21:
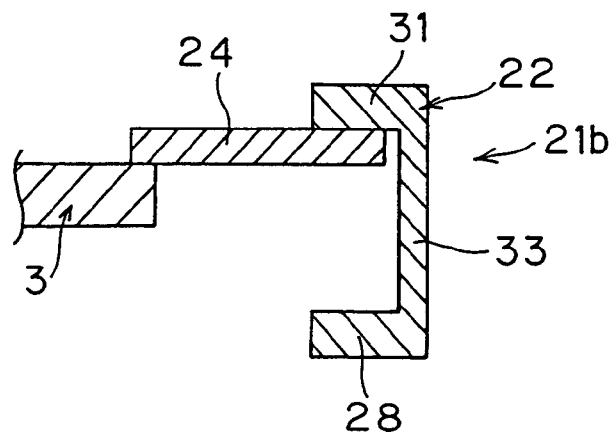
FIG. 21 is a sectional view showing an operational example of the vibration damping mount 21b.
Figure 22:
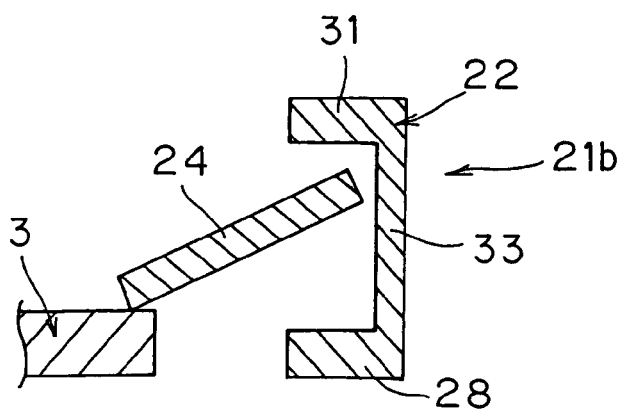
FIG. 22 is a sectional view showing another operational example of the vibration damping mount 21b.
Figure 23:
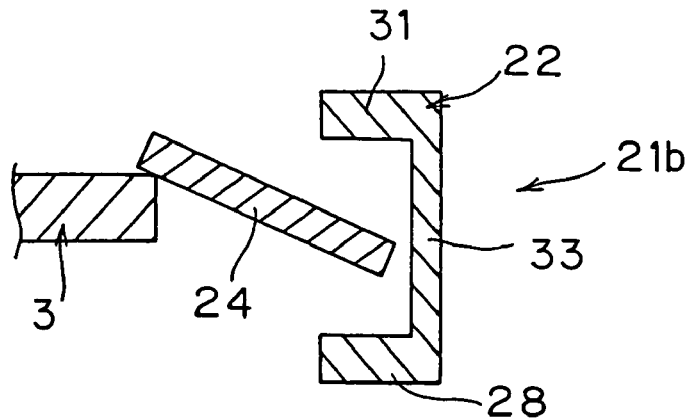
FIG. 23 is a sectional view showing yet another operational example of the vibration damping mount 21b.
Figure 24:
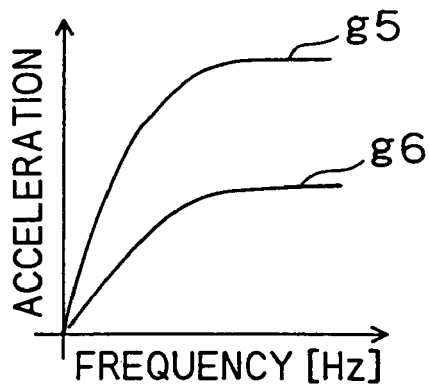
FIG. 24 is a graph illustrating an action of this embodiment.

FIG. 14 is a sectional view of a vibration damping mount 21b of a third embodiment of the present invention. FIG. 15 is a sectional view of a comparative example of this embodiment. FIG. 16 is a sectional view showing characteristics of the vibration damping mount 21b. FIG. 17 is a plan view of spring washers 23 and 24 of the vibration damping mount 21b. FIG. 18 is a perspective view of the spring washers 23 and 24. FIG. 19 is a perspective view of a comparative example for the vibration damping mount 21b. FIG. 20 is a sectional view of the comparative example. FIG. 21 is a sectional view showing an operational example of the vibration damping mount 21b. FIG. 22 is a sectional view showing another operational example of the vibration damping mount 21b. FIG. 23 is a sectional view showing yet another operational example of the vibration damping mount 21b. FIG. 24 is a graph illustrating an action of this embodiment.

The vibration damping mount 21b of this embodiment will be hereinafter explained with reference to FIGS. 14 to 24.

This embodiment is similar to the second embodiment. Components corresponding to those in the second embodiment are denoted by the identical reference numerals and signs. In addition, in FIGS. 15 to 23, only one spring washer 24 and one grommet 26 are shown for simplification of the explanation. This embodiment is characterized in that, in the vibration damping mount 21a of the second embodiment, the grommets 25 and 26 are not used, and the outer peripheries of the spring washers 23 and 24 are formed as free ends that vibrate freely.

As a comparative example of this embodiment, the vibration damping mount 21a of the second embodiment is cited with reference to FIG. 15. As shown in FIG. 15, a length c in a radial direction of a part contributing to the bending displacement of the spring washers 23 and 24 is calculated as follows with respect to a projection length a, by which inward ends in the radial direction of the grommets 25 and 26 project from inward ends in the radial direction of the heat shield 3, and a distance b from the outer peripheries of the flange sections 28 and 31 to the inward ends in the radial direction of the heat shield 3.

$$c = b - a \qquad (4)$$

On the other hand, in the vibration damping mount 21b of this embodiment, as shown in FIG. 16, since the outer peripheries of the spring washers 23 and 24 are not regulated by the grommets 25 and 26, a length d in the radial direction of the part contributing to the bending displacement of the spring washers 23 and 24 is calculated as follows.

$$d = b \qquad (5)$$

Therefore, $$d > c \qquad (6)$$

If the spring washers 23 and 24 of the vibration damping mount 21b of this embodiment are used, a length in the radial direction of the bolt 7, in which the spring washers 23 and 24 are bent and displaced, can be set large.

In this embodiment, the spring washers 23 and 24 are generally plate-like members consisting of, for example, an expand metal, and as shown in FIGS. 17 and 18, the following relation is established among an inner diameter e and an outer diameter f of the spring washers 23 and 24 in a natural state and an inner diameter e and an outer diameter f1 of the spring washers 23 and 24 in a bent state.

$$f1 < f \qquad (7)$$

On the other hand, as shown in FIGS. 19 and 20, concerning the inner diameter e and the outer diameter f of the spring washers 23 and 24 in the natural state and an outer diameter h of the grommets 25 and 26 and the inner diameter e and the outer diameter f1 of the spring washers 23 and 24 in the bent state and an outer diameter h1 of the grommets 25 and 26, the outer diameters h and h1 are substantially equal.

This is because the outer peripheries of the spring washers 23 and 24 are fixed by the grommets 25 and 26, and the grommets 25 and 26 are formed of a relatively hard material such as stainless steel as described above.

Therefore, as shown in FIGS. 21 to 23, the spring washers 23 and 24 used in the vibration damping mount 21b of this embodiment are bent and displaced freely in an axial direction of the collar member 22, and a degree of bending of the spring washers 23 and 24 is increased remarkably.

Therefore, a vibration, which is generated from the exhaust manifold 2 and travels through the bolt 7, is transmitted to the spring washers 23 and 24 via the collar member 22. In this case, in this embodiment, since the degree of bending of the spring washers 23 and 24 is increased remarkably, the vibration is absorbed efficiently by the relatively large deformation of the spring washers 23 and 24, and transmission of the vibration to the heat shield 3 can be controlled.

The inventor performed an experiment concerning such an action and obtained measurement results shown in a graph in FIG. 24. In FIG. 24, a horizontal axis shows a frequency, and a vertical axis shows an acceleration of a vibration. A curve g5 indicates a result of measuring a vibration of the vibration damping mount 21a of the second embodiment having the grommets 25 and 26 mounted on the spring washers 23 and 24, and a curve g6 indicates a result of measuring a vibration in this embodiment.

As it is seen from these measurement results, although the vibration damping mount 21a of the second embodiment attains remarkable actions and effects compared with the conventional technique as described above, the vibration damping mount 21b of this embodiment attains a damping characteristic more remarkable than that in the second embodiment.

In other words, in the vibration damping mount 21b, the transmission of a vibration from the exhaust manifold 2 to the heat shield 3 is controlled efficiently. Thus, a situation in which the heat shield 3 is resonated by the transmitted vibration or metal fatigue occurs near the attachment portion of the bolt 7 to the heat shield 3 can be prevented, a situation of an increase in noise, occurrence of a crack in the heat shield 3, and the like can be eliminated, and a quality of the heat shield 3 can be improved remarkably.

In addition, in this embodiment, since the spring washers 23 and 24 formed in a plate shape are used, the spring washers 23 and 24 deform at the time when a vibration is transmitted. The vibration is absorbed by this deformation. Therefore, compared with the case in which the spring washers 23 and 24 consist of a felt-like material made of inorganic fiber or the like, a situation in which a damping member deteriorates due to secular changes and self weights thereof, compression and restoration characteristics fall, and a vibration control action falls can be prevented. In addition, in the case of the felt-like material, a problem is assumed in that the fiber decomposes and flies as time elapses. However, in this embodiment, such a situation is also prevented.

Consequently, since the transmission of a vibration from the exhaust manifold 2 to the heat shield 3 is controlled efficiently, actions and effects same as those described above are attained.

FOURTH EMBODIMENT

Figure 26:
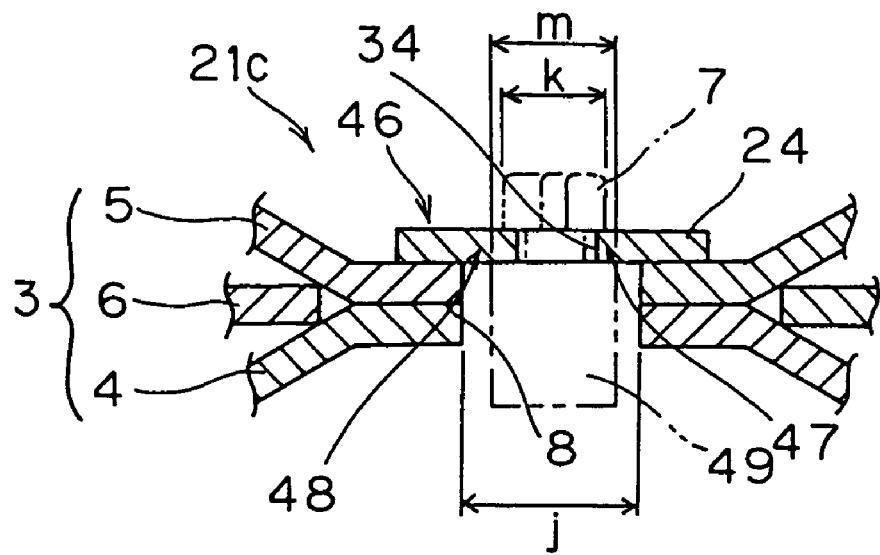
FIG. 26 is a sectional view of a vibration damping mount 21c according to a fourth embodiment of the present invention.

FIG. 26 is a sectional view of a vibration damping mount 21c of a fourth embodiment of the present invention. This embodiment will be hereinafter explained with reference to FIG. 26.

This embodiment is similar to the above-mentioned embodiments. Components corresponding to those in the above-mentioned embodiments are denoted by the identical reference numerals and signs. This embodiment is characterized in that at least one of the spring washers 23 and 24 used in the above-mentioned embodiments is used, and at least one of the spring washers 23 and 24 to be used is fixed to the heat shield 3 with spot welding or an arbitrary fixing technique. In the following explanation, as an example, a case of using only the spring washer 24 is assumed.

In this embodiment, as an attachment structure for attaching the heat shield 3 to the exhaust manifold 2, a structure described below is used. In the heat shield 3, an insertion hole 8 with a diameter j for inserting the bolt 7 is provided, the spring washer 24 is arranged so as to cover the insertion hole 8, and the spring washer 24 is fixed to the heat shield 3 in a coupling portion 46 around the insertion hole 8 by a technique such as spot welding or a rivet. The bolt 7 is inserted through the insertion hole 34 formed in this spring washer 24 and screwed into an attachment boss 49 or the like of the exhaust manifold 2 to attach the heat shield 3 to the exhaust manifold 2.

In this case, appropriate dimensions are selected for the diameter j of the insertion hole 8 of the heat shield 3, a diameter k of the bolt 7, and a diameter m of the attachment boss 49 such that a distance in a radial direction of a free vibration portion 48 is a distance of a degree allowing free vibration due to a spring property of the spring washer 24 to sufficiently contribute to the damping action as described above. Here, the free vibration portion 48 is an area where free vibration occurs due to bending displacement between a fixed portion 47, which is fixed between the attachment boss 49 with the diameter m of the exhaust manifold 2 and the bolt 7 with the diameter k of the spring washer 24, and the coupling portion 46.

In the vibration damping mount 21c of such a structure, since the buffer action according to the deformation of the spring washer 24 is also realized, actions and effects same as those explained in the above-mentioned embodiments are realized.

In addition, in any one of the vibration damping mounts 21, 21a, 21b, and 21c of the above-mentioned embodiments, the damping member 40 may be formed of a damping alloy body including at least Al with a content of 6 to 10 weight % and the balance Fe or formed of an alloy material including this damping alloy body.

As such a damping alloy body, for example, an Fe—Al damping alloy manufactured by Kabushiki Kaisha Urban Materials can be used. The damping alloy has an Al content of 6 to 10 weight % and, other than Al, includes Fe and inevitable impurities (Si of 0.1 weight % or less; Mn of 0.1 weight % or less; C, N, S and O of 0.1 weight % or less in total). In addition, it is essential that an average particle diameter of a crystal of the damping alloy body is in a range of 300 to 700 μm. A thickness of this damping alloy body is, for example, about 0.1 to 1.0 mm.

Since such a damping alloy body is a ferromagnetic material, a vibration damping mechanism therefor is according to magnetic/mechanical history loss following irreversible movement of a magnetic wall.

Figure 27:
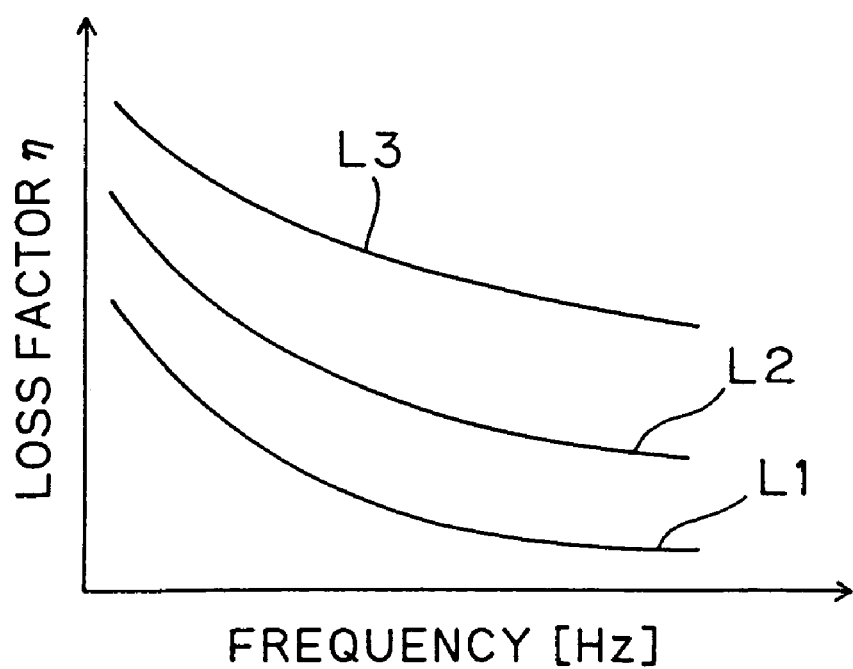
FIG. 27 is a graph illustrating an action of this embodiment.

As a typical comparative example, the inventor measured a damping coefficient, which indicates a damping capacity of vibration, for a steel plate, the damping alloy body, and a normal sandwich type damping steel plate, respectively. Results of the measurement are indicated by lines L1, L2 and L3 in FIG. 27. In this way, the inventor confirmed that a damping characteristic was improved remarkably in the damping alloy body compared with the normal metal plate.

FIFTH EMBODIMENT

A vibration damping mount 21d according to a fifth embodiment of the present invention will be hereinafter explained.

Figure 28:
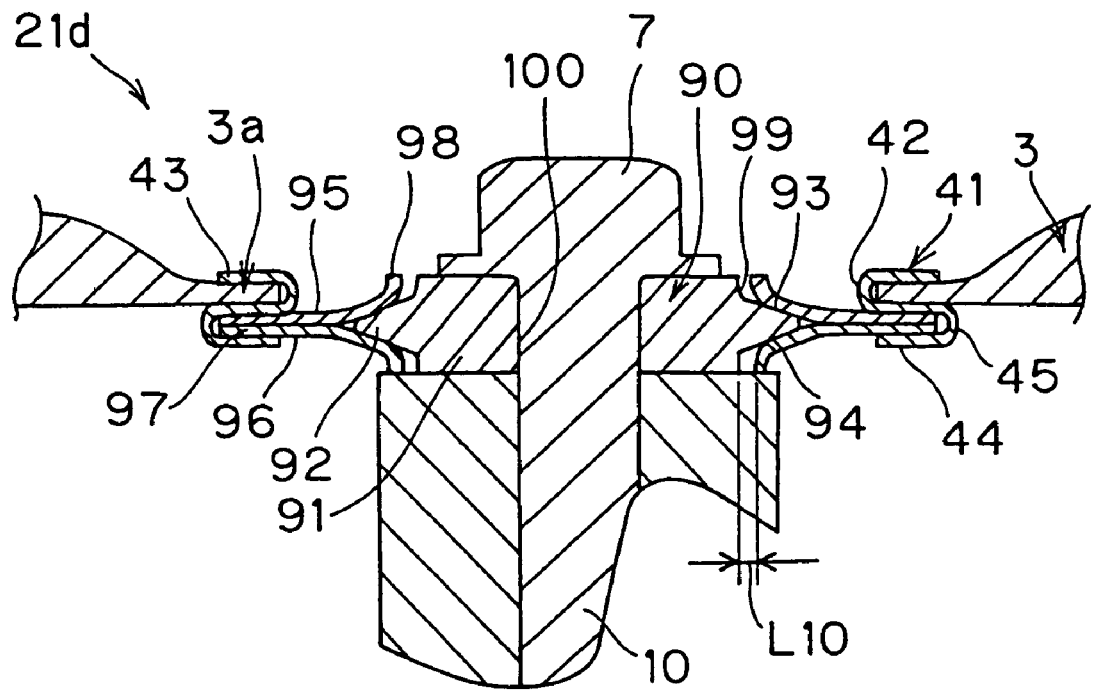
FIG. 28 is a sectional view of a vibration damping mount 21d according to this embodiment.
Figure 30:
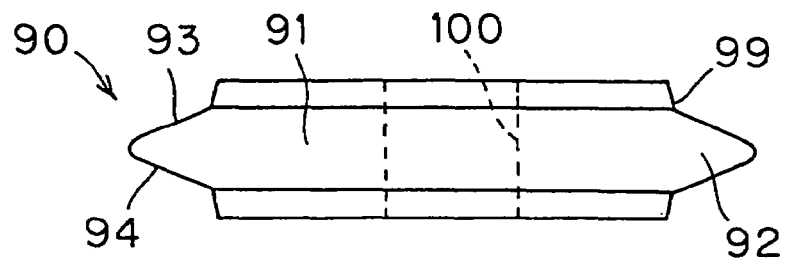
FIG. 30 is a front view of a spacer 90 that is used in this embodiment.
Figure 31:
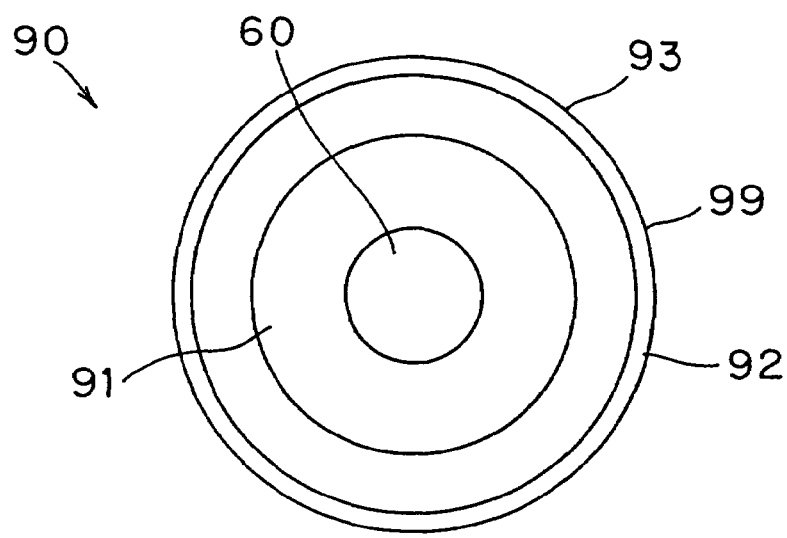
FIG. 31 is a plan view of the spacer 90.
Figure 32:
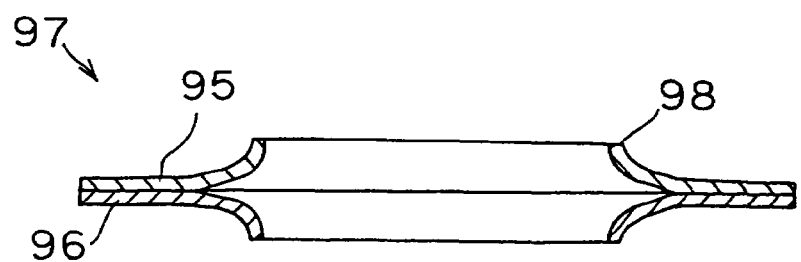
FIG. 32 is a sectional view of a nip member 97 that is used in this embodiment.
Figure 33:
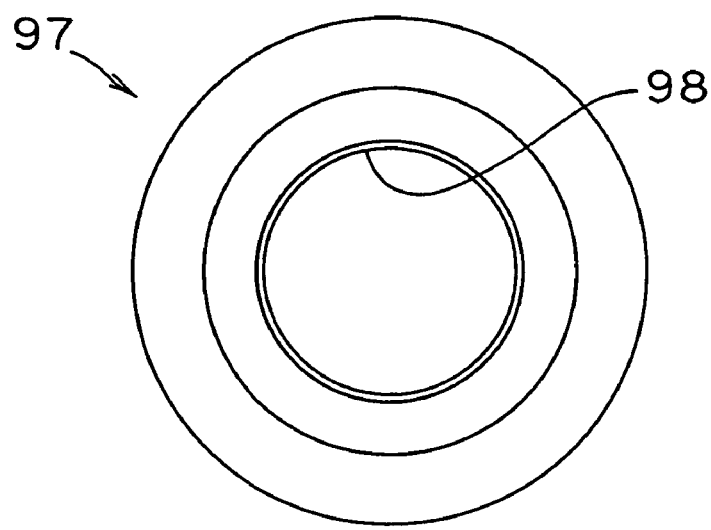
FIG. 33 is a plan view of the nip member 97.

FIG. 28 is a sectional view of the vibration damping mount 21d of this embodiment. FIG. 29 is a plan view of the vibration damping mount 21d in FIG. 28. FIG. 30 is a front view of a spacer 90 used in this embodiment. FIG. 31 is a plan view of the spacer 90. FIG. 32 is a sectional view of a nip member 97 used in this embodiment. FIG. 33 is a plan view of the nip member 97. This embodiment is similar to the above-mentioned embodiments. Components corresponding to those in the above-mentioned embodiments are denoted by the identical reference numerals and signs.

The vibration damping mount 21d of this embodiment has an insertion hole 100, through which the bolt 7 is inserted, and includes the spacer 90 formed of, for example, a metal material having a relatively low friction coefficient and a high hardness. The spacer 90 includes a substantially cylindrical base section 91, in which the insertion hole 100 is formed, and a sliding section 92, which integrally continues outwardly in a radial direction of the base section 91 and has a pair of sliding surfaces 93 and 94, a distance between which in an axial direction decreases toward a further outside in the radial direction.

The sliding surfaces 93 and 94 have a shape of a side of a truncated cone and are constituted as relatively flat taper surfaces in the radial direction. In the spacer 90, a stepped portion 99 elevated in the axial direction of the bolt 7 is formed near a boundary of the sliding section 92 and the base section 91.

The substantially annular nip member 97, which is constituted by a tabular metal material having a spring property such as an expand metal of stainless steel and has a zinc film formed on a surface thereof by, for example, Dacrotized (trademark) treatment, is arranged in the outside in the radial direction of the spacer 90. The nip member 97 includes a pair of nip pieces 95 and 96 that are arranged increasingly spaced apart from each other in the axial direction from an outside in the radial direction toward an inside in the radial direction. The nip pieces 95 and 96 are constituted so as to elastically nip the sliding section 92 of the spacer 90 from sides opposed to each other in the axial direction on the inside in the radial direction.

In addition, in parts near inside ends in the radial direction of the nip pieces 95 and 96, an elevated portion 98, which is engageable with a stepped portion 99 at the time of displacement to the inside in the radial direction of the nip member 97, is formed with an interval L10 in the radial direction from the stepped portion 99 of the spacer 90, respectively. The spacer 90 and the nip member 97 have such a structure, whereby mutual displacement at least in the radial direction is allowed.

In the outside in the radial direction of the nip member 97, a grommet 41, which is a coupling member formed of, for example, an aluminum alloy and having substantially an S shaped section, is provided. The grommet 41 has an insertion hole 42 through which the bolt 7 to be screwed into the boss for bolt 10 of the exhaust manifold 2 is inserted.

In addition, grommet 41 includes: a first retaining section 43 having a shape with an inner peripheral edge of a circular metal plate folded back to an outer peripheral portion in order to retain the heat shield 3; a second retaining section 44 having a shape with an outer peripheral edge of the circular metal plate folded back to an inner peripheral portion in order to retain the nip member 97; and a coupling section 45 that is formed bending over the first retaining section 43 and the second retaining section 44.

In this embodiment, the coupling section 45 is a portion extending form a bent portion of the first retaining section 43 to a bent portion of the second retaining section 44. The second retaining section 44, the coupling section 45, and the first retaining section 43 are provided in this order from the exhaust manifold 2 side. In addition, a through-hole is formed in a portion of the heat shield 3 where the vibration damping mount 21d is mounted. A part around this through-hole is the above-mentioned substantially planar crush object portion where a crush portion 3a is formed in advance. Therefore, the first retaining section 43 of the grommet 41 retains this crush portion 3a.

Actions and effects of the vibration damping mount 21d will be hereinafter explained. In the vibration damping mount 21d, a vibration, which is generated from the exhaust manifold 2 and travels through the bolt 7, is transmitted to the heat shield 3 via the spacer 90, the nip member 97, and the grommet 41.

In this case, in this embodiment, the sliding section 92 on the outside in the radial direction of the spacer 90 is elastically nipped by the pair of nip pieces 95 and 96 of the nip member 97. The spacer 90 and the nip member 97 are allowed to be displaced from each other in the radial direction as described above. Therefore, when the spacer 90 vibrates in the radial direction, the nip member 97 and the spacer 90 are displaced from each other in the radial direction while the pair of nip pieces 95 and 96 slide each other along the sliding section 92 of the spacer 90. Consequently, the vibration in the radial direction of the spacer 90 is absorbed by the mutual displacement in the radial direction of the spacer 90 and the nip member 97.

In addition, the nip member 97 is constituted by the pair of nip pieces 95 and 96 having a spring property. Moreover, the pair of nip pieces 95 and 96 elastically nip the sliding section 92 of the spacer 90 and are not fixed to the sliding section 92. Therefore, the spacer 90 can be vibrated and displaced in the axial direction while sliding with respect to the nip member 97 by a vibration in the axial direction of the spacer 90. Moreover, since the spacer 90 is formed of a metal material having a spring property, the nip member 97 is bent and vibrated in the axial direction by the vibration in the axial direction of the spacer 90.

Consequently, the vibration in the axial direction of the spacer 90 is absorbed by the mutual displacement of the spacer 90 and the nip member 97 involving mutual sliding and the displacement of the nip member 97 itself. A degree of transmission of the vibration of the bolt 7 to the heat shield 3 can be controlled remarkably.

In addition, in this embodiment, the second retaining section 44, the coupling section 45, and the first retaining section 43 of the grommet 41 are provided in this order from the exhaust manifold 2 side. In other words, the first retaining section 43 is located on the opposite side of the exhaust manifold 2 with respect to the nip member 97.

Therefore, even in the case in which the attachment boss 10 of the exhaust manifold 2 has a size in a radial direction overlapping the grommet 41, a situation in which the attachment boss 10 comes into contact with the grommet 41 or the heat shield 3 retained by the grommet 41 is prevented. Consequently, an increase in noise due to the contact is controlled.

In addition, in the case in which contact of the attachment boss 10 and the grommet 41 or the heat shield 3 is assumed, it is assumed that a contact portion of the grommet 41 with the attachment boss 10 wears due to this contact to result in breakage. In this embodiment, occurrence of such breakage is prevented. Consequently, a quality of the vibration damping mount 21d is improved remarkably.

Further, according to this embodiment, a zinc film having an ionization tendency closer to that of aluminum than that of iron is formed on the surface of the nip member 97. Therefore, even in the case in which the nip member 97 is formed of a stainless steel plate and the grommet 41 is formed of an aluminum alloy as described above, an action of reducing a difference of the ionization tendency between the nip member 97 and the grommet 41 is realized. Consequently, occurrence of electrolysis in the grommet 41 and the nip member 97 is controlled. In this regard, a quality of the vibration damping mount 21d is also improved remarkably.

Moreover, in this embodiment, the stepped portion 99 is formed in the spacer 90, and the elevated portion 98 is formed in the pair of nip pieces 95 and 96, respectively. Therefore, in the case in which displacement in the radial direction of the spacer 90 and the nip member 97 increases, the stepped portion 99 of the spacer 90 and the elevated portion 98 of the nip member 97 come into abutment and engage with each other to prevent excessive mutual displacement of the spacer 90 and the nip member 97. Consequently, occurrence of deficiency such as severe collision of the spacer 90 and the nip member 97 resulting in breakage of both of them can be prevented.

SIXTH EMBODIMENT

Figure 34:
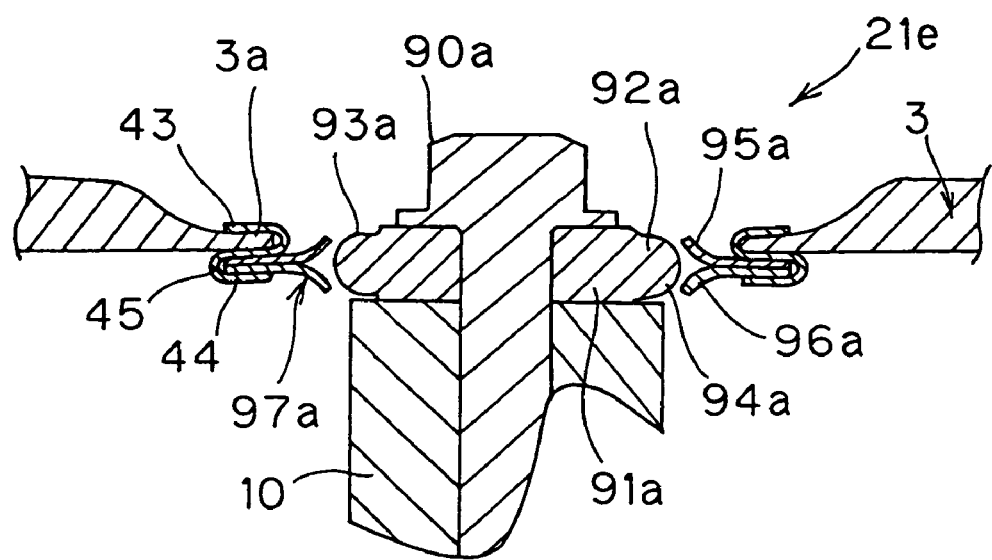
FIG. 34 is a sectional view of a vibration damping mount 21e of this embodiment.
Figure 35:
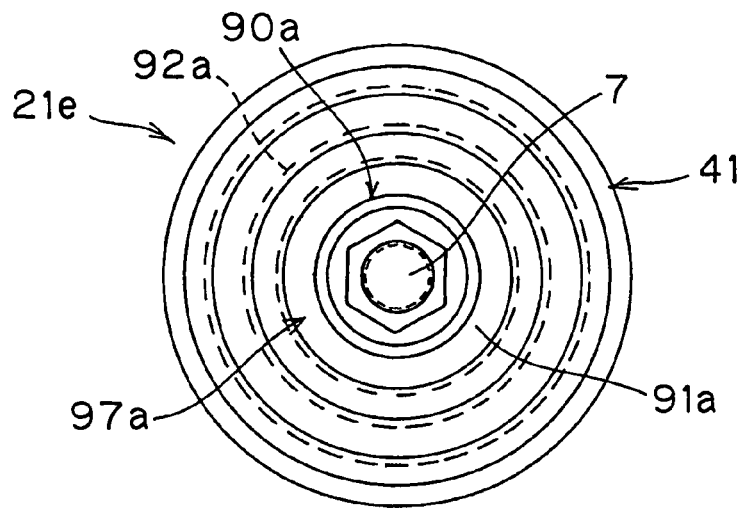
FIG. 35 is a plan view of the vibration damping mount 21e.
Figure 36:
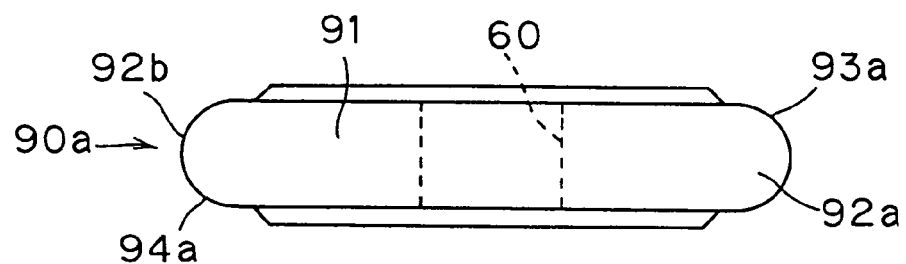
FIG. 36 is a sectional view of a spacer 90a that is used in this embodiment.
Figure 37:
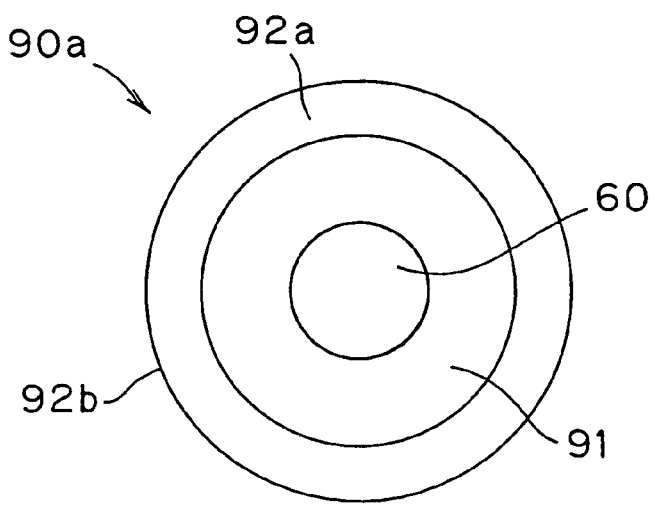
Figure 38:
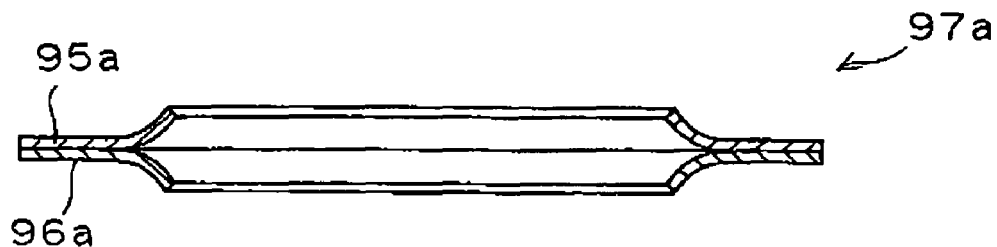
FIG. 38 is a sectional view of a nip member 97a that is used in this embodiment.
Figure 39:
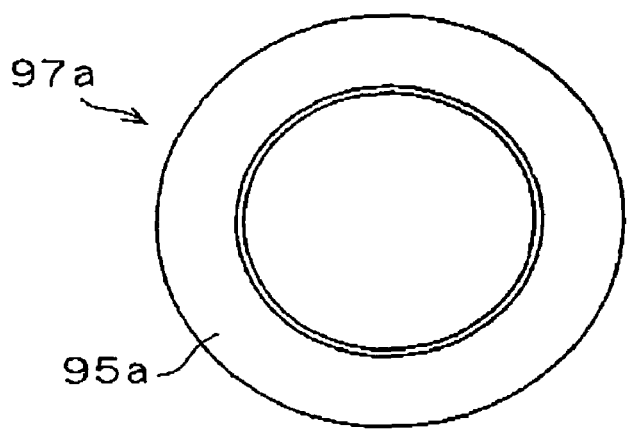
Figure 40:
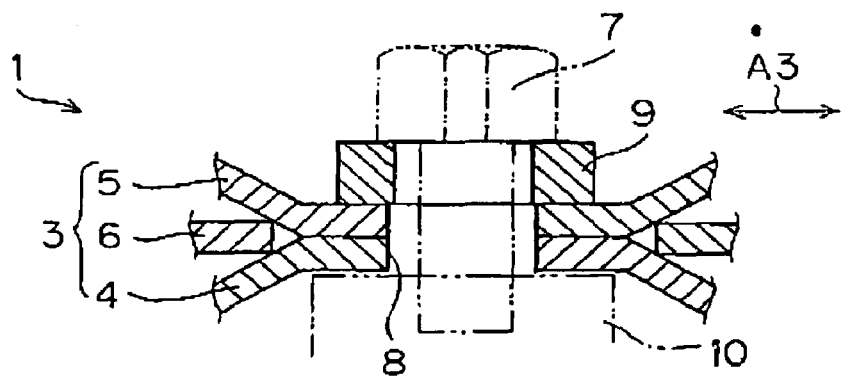
FIG. 40 is a sectional view of a conventional technique.
Figure 41:
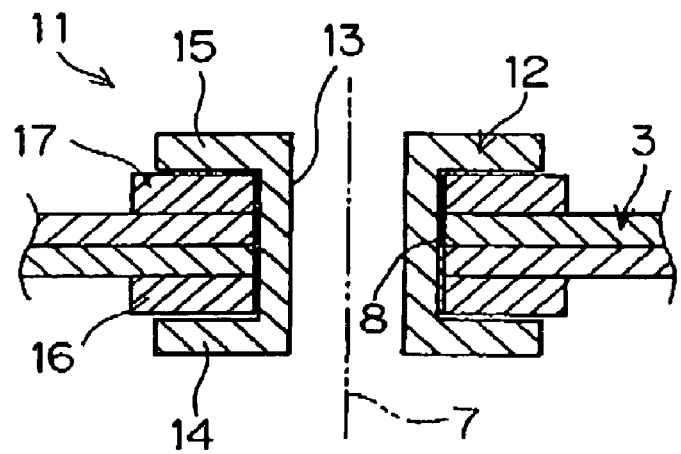
FIG. 41 is a sectional view showing a vibration damping mount 11.
Figure 42:
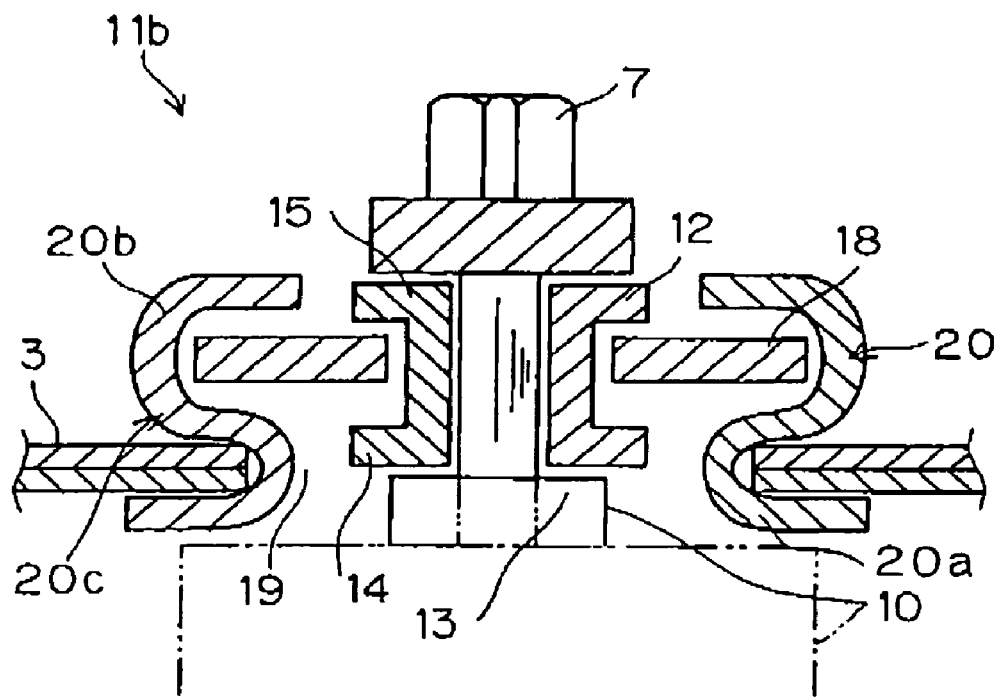
FIG. 42 is a sectional view showing a vibration damping mount 11b.

A vibration damping mount 21e according to a sixth embodiment will be hereinafter explained. FIG. 34 is a sectional view of the vibration damping mount 21e of this embodiment. FIG. 35 is a plan view of the vibration damping mount 21e in FIG. 34. FIG. 36 is a sectional view of a spacer 90a used in this embodiment. FIG. 37 is a plan view of the spacer 90a. FIG. 38 is a sectional view of a nip member 97a used in this embodiment. FIG. 39 is a plan view of the nip member 97a. This embodiment is similar to the fifth embodiment. Components corresponding to those in the fifth embodiment are denoted by the identical reference numerals and signs.

A characteristic structure of this embodiment is that the spacer 90a and the nip member 97a of shapes and structures explained below are used instead of the spacer 90 and the nip member 97 used in the fifth embodiment.

The spacer 90a of this embodiment includes a substantially cylindrical base section 91a, in which the insertion hole 100 is formed, and a sliding section 92a, which integrally continues outwardly in a radial direction of the base section 91a and has a sliding surface 92b forming an arc surface with a sectional shape projected toward an outside in a radial direction. More specifically, as shown in FIG. 36, as a shape of an outer peripheral surface, the sliding surface 92b includes arc surfaces 93a and 94a having a ¼ arc surface, respectively.

The substantially annular nip member 97a, which is constituted by a tabular metal material having a spring property such as an expand metal of stainless steel and has a zinc film formed on a surface thereof by, for example, Dacrotized (trademark) treatment, is arranged in the outside in the radial direction of the spacer 90a. The nip member 97a includes a pair of nip pieces 95a and 96a that are arranged increasingly spaced apart from each other in the axial direction from an outside in the radial direction toward an inside in the radial direction. The nip pieces 95a and 96a are constituted so as to elastically nip the sliding section 92a of the spacer 90s from sides opposed to each other in the axial direction on the inside in the radial direction.

In addition, in parts near inside ends in the radial direction of the nip pieces 95a and 96a, a specific elevated shape such as the elevated portion 98 of the nip member 97 in the fifth embodiment is not formed.

The vibration damping mount 21e of this embodiment can realize actions and effects equivalent to those in the above-mentioned embodiments and can also realize specific actions and effects described below peculiar to this embodiment.

In the vibration damping mount 21e of this embodiment, the sliding surface 92b of the spacer 90a is formed as an arc surface projected outwardly in the radial direction. Therefore, when the spacer 90a and the nip member 97a are displaced from each other while sliding, the pair of nip pieces 95a and 96a of the nip member 97a are displaced smoothly along the sliding surface 92b forming the arc surface.

Consequently, even in the case in which displacement in the radial direction of the spacer 90a and the nip member 92a is large, a situation in which the spacer 90a and the nip member 92a collide against each other is prevented, and occurrence of deficiency such as breakage of both the spacer 90a and the nip member 92a can be prevented.

In addition, the pair of nip pieces 95a and 96a are displaced smoothly along the sliding surface 92b forming the arc surface. Thus, the spacer 90a and the nip member 92a are displaced from each other in the radial direction. Moreover, the nip member 92a can be displaced easily in the axial direction as well around the part near the contact position of the spacer 90a and the nip member 92a.

Therefore, the nip member 92a is displaced in the radial direction with respect to the spacer 90a and absorbs a radial direction component of a vibration from the spacer 90a. In addition, the nip member 92a is easily displaced in the axial direction with respect to the spacer 90a and absorbs an axial direction component of the vibration from the spacer 90a. Consequently, the vibration damping mount 21e can control the vibration from the spacer 90a remarkably.

The present invention is not limited to the above-mentioned embodiments but includes various modifications as long as the modifications do not depart from the spirit of the present invention.

Even in the case in which an attachment portion of one object member to a screw member has a size in a radial direction overlapping a coupling member, a situation in which the attachment portion of the one object member comes into contact with the coupling member or the other object member retained by the coupling member is prevented. Consequently, an increase in noise, which is assumed in the case in which this contact occurs, is controlled. The vibration damping mount of the present invention can be applied to applications in a wide range of technical fields other than the engine for automobiles explained in the section of the embodiments of the present invention.

In addition, since a first direction, in which corrugate shapes formed on a metal heat shield extend, is set in a direction crossing a major ridge equivalent portion of the metal heat shield, the corrugate shapes realize a function of a rib with respect to a vibration around the ridge equivalent portion. According to this rib action, the vibration of the metal heat shield can be controlled, occurrence of a crack in the metal heat shield can be prevented, and a quality of the metal heat shield can be improved remarkably. Consequently, the present invention can be applied widely to many kinds of heat shields that are required to block heat, vibration, and noise, and also required to be light.

What is claimed is:

1. A vibration damping mount that is arranged between plural object members, which are coupled each other using a screw member, and damps transmission of a vibration from one object member, which becomes a vibration source, to the other object member, comprising:

a substantially annular damping member that has an insertion hole, through which the screw member to be attached to the one object member is inserted, and is provided externally surrounding the screw member;

a coupling member that has an insertion hole through which the screw member to be attached to the one object member is inserted, and includes a first retaining section for retaining the other object member, a second retaining section for retaining the damping member, and a coupling section for coupling the first retaining section and the second retaining section, the second retaining section, the coupling section, and the first retaining section being provided in this order from the one object member;

a collar member that is arranged between the screw member and the damping member and includes a pair of flange sections, which nip the damping member from both sides in an axial direction with gaps formed on both the sides, and a coupling section, which couples the pair of flange sections each other and has a gap in a radial direction between the coupling section and the damping member; and wherein at least one of the coupling member and the collar member is formed of an aluminum alloy, the damping member is formed of an iron alloy, a film is formed on a surface of the damping member, and the film contains at least a metal or a metal compound having an ionization tendency closer to that of aluminum than that of iron.

2. A vibration damping mount according to claim 1, wherein the metal or the metal compound is zinc or a zinc compound.

3. A vibration damping mount that is arranged between plural object members, which are coupled each other using a screw member, and damps transmission of a vibration from one object member, which becomes a vibration source, to the other object member, comprising:

a substantially annular damping member that has an insertion hole, through which the screw member to be attached to the one object member is inserted, and is provided externally surrounding the screw member;

a coupling member that has an insertion hole through which the screw member to be attached to the one object member is inserted, and includes a first retaining section for retaining the other object member, a second retaining section for retaining the damping member, and a coupling section for coupling the first retaining section and the second retaining section, the second retaining section, the coupling section, and the first retaining section being provided in this order from the one object member;

a collar member that is arranged between the screw member and the damping member and includes a pair of flange sections, which nip the damping member from both sides in an axial direction with gaps formed on both the sides, and a coupling section, which couples the pair of flange sections each other and has a gap in a radial direction between the coupling section and the damping member; and wherein the damping member includes a damping alloy body containing at least Al with a content of 6 to 10 weight % and the balance Fe.

* * * * *